US012482643B2

(12) United States Patent
Kovarik

(10) Patent No.: US 12,482,643 B2
(45) Date of Patent: Nov. 25, 2025

(54) ELECTROSPRAY ION SOURCE ASSEMBLY

(71) Applicant: DH Technologies Development Pte. Ltd., Singapore (SG)

(72) Inventor: Peter Kovarik, Markham (CA)

(73) Assignee: DH TECHNOLOGIES DEVELOPMENT PTE. LTD., Singapore (SG)

( * ) Notice: Subject to any disclaimer, the term of this patent is extended or adjusted under 35 U.S.C. 154(b) by 678 days.

(21) Appl. No.: 17/799,216

(22) PCT Filed: Feb. 12, 2021

(86) PCT No.: PCT/IB2021/051212
§ 371 (c)(1),
(2) Date: Aug. 11, 2022

(87) PCT Pub. No.: WO2021/161267
PCT Pub. Date: Aug. 19, 2021

(65) Prior Publication Data

US 2023/0101315 A1 Mar. 30, 2023

Related U.S. Application Data

(60) Provisional application No. 62/976,332, filed on Feb. 13, 2020.

(51) Int. Cl.

| | |
|---|---|
| ***H01J 49/16*** | (2006.01) |
| ***G01N 30/72*** | (2006.01) |
| ***H01J 49/00*** | (2006.01) |

(52) U.S. Cl.
CPC ........ *H01J 49/165* (2013.01); *G01N 30/7266* (2013.01); *H01J 49/0031* (2013.01)

(58) Field of Classification Search
CPC ........................... H01J 49/165; G01N 30/7266
See application file for complete search history.

(56) References Cited

U.S. PATENT DOCUMENTS 5,103,093 A * 4/1992 Sakairi ............... G01N 30/7246 250/281
6,410,914 B1 6/2002 Park et al.
(Continued)

FOREIGN PATENT DOCUMENTS

GB 2407698 A 5/2005
WO 2019162853 A1 8/2019

OTHER PUBLICATIONS

International Search Report and Written Opinion for International Application No. PCT/IB2021/051212 dated Apr. 5, 2021.

*Primary Examiner* — Michael J Logie
(74) *Attorney, Agent, or Firm* — Potomac Law Group, PLLC; Reza Mollaaghababa; Brian Hairston

(57) ABSTRACT

An ion source assembly for use in a mass spectrometry system comprises a housing defining an ionization chamber disposed in fluid communication with a sampling orifice of a mass spectrometer system. The housing defines a first opening for coupling to a first electrospray probe to discharge a liquid sample at flow rates greater than a nanoflow range along a longitudinal axis that is substantially orthogonal to a central axis of the sampling orifice. An elongate auxiliary electrode assembly extends from the housing to an electrically conductive distal end disposed in the ionization chamber such that the electrically conductive distal end is disposed substantially on the central axis of the sampling orifice. The electrically conductive distal end may be coupled to a power supply to generate an electric field to improve the desolvation of the sample plume and the transport of ions ejected from the sample plume into the sampling orifice.

20 Claims, 18 Drawing Sheets

(56) References Cited

U.S. PATENT DOCUMENTS

| | | | | |
|---|---|---|---|---|
| 6,653,626 | B2 * | 11/2003 | Fischer | H01J 49/145 250/288 |
| 7,204,431 | B2 * | 4/2007 | Li | H01J 49/167 239/707 |
| 2004/0079881 | A1 * | 4/2004 | Fischer | H01J 49/0445 250/423 P |
| 2006/0255261 | A1 * | 11/2006 | Whitehouse | H01J 49/165 250/288 |
| 2012/0104248 | A1 * | 5/2012 | Hardman | H01J 49/167 250/288 |
| 2015/0021469 | A1 * | 1/2015 | Bajic | H01J 49/0031 250/288 |
| 2018/0011057 | A1 * | 1/2018 | Nishiguchi | H01J 49/0445 |

* cited by examiner

ELECTROSPRAY ION SOURCE ASSEMBLY

RELATED APPLICATION

This application claims priority to U.S. provisional application No. 62/976,332 filed on Feb. 13, 2020, entitled "Electrospray Ion Source Assembly," which is incorporated herein by reference in its entirety.

FIELD

The present invention relates generally to an electrospray ion source and more particularly to an electrospray ion source assembly having an auxiliary electrode for providing improved desolvation and/or ion sampling for electrospray ion sources accommodating sample flow rates above a nanoflow range.

INTRODUCTION

Mass spectrometry (MS) is an analytical technique for measuring mass-to-charge ratios of molecules, with both qualitative and quantitative applications. MS can be useful for identifying unknown compounds, determining the structure of a particular compound by observing its fragmentation, and quantifying the amount of a particular compound in a sample. Mass spectrometers detect chemical entities as ions such that a conversion of the analytes to charged ions must occur during sample processing.

A variety of methods are known for ionizing chemical entities within a liquid sample into charged ions suitable for detection with MS. One of the more common ionization methods is electrospray ionization (ESI). In a typical ESI process, a liquid sample is discharged into an ionization chamber via an electrically conductive needle, electrospray electrode, or nozzle, while an electric potential difference between the electrospray electrode and a counter electrode generates a strong electric field within the ionization chamber that electrically charges the liquid sample. The electric field generated within the ionization chamber causes the liquid discharged from the electrospray electrode, needle, or nozzle to disperse into a plurality of charged micro-droplets drawn toward the counter electrode if the charge imposed on the liquid's surface is strong enough to overcome the surface tension of the liquid. As solvent within the micro-droplets evaporates during desolvation in the ionization chamber, charged analyte ions can enter a sampling orifice of the counter electrode for subsequent mass spectrometric analysis.

In conventional ion sources, optimization of sensitivity performance requires the user to successfully adjust approximately seven interacting parameters, several of which involve physical adjustments within the source and others which can involve software-settable parameters such as temperature, electrical potential, and gas flows. These parameters are highly dependent on the flow rate of the liquid sample stream. As an example, as flow rate increases the location of the probe tip relative to the entrance aperture of the mass spectrometer is usually increased, ion source temperature is increased, electrospray ionization electrical potential is optimized differently, and nebulization and heat transfer gas flows are increased. Additionally, the protrusion of the emitter from the discharge end of the probe often requires adjustment, which in turn requires re-optimization of nebulization gas and ESI electrical potential. An optimal set of parameters exists for each flow rate. When optimizing for sensitivity performance for a particular flow rate, each adjustment of the vertical position of the probe can trigger readjustment of ion source temperature, gas flows, and ESI electrical potential. Sensitivity performance optimization can be further complicated when the user attempts to determine optimal operational parameters for a mixture of compounds. In general, it is not possible to determine a single set of operational parameters which would produce optimal sensitivity for all compounds in a mixture, and the "optimal" parameters usually involve a performance compromise for a subset of the compounds in the mixture. As such, obtaining optimal performance with a conventional ion source is time consuming and can be difficult, even for experienced users.

Further, an ion probe of an ESI source can receive samples, for example, from an upstream liquid chromatography (LC) column, at flow rates within a particular range. If flow rates above or below that range are desired, the ion probe must be replaced with another probe that can accommodate the desired flow rates. Such replacement of probes can be, however, cumbersome and time consuming.

Accordingly, there is a need for enhanced ion sources, and more particularly for enhanced electrospray ion sources for use in mass spectrometry that may provide improved ionization and ion sampling efficiency.

SUMMARY

Methods and systems for electrospray ionization are provided herein. In accordance with various aspects of the present teachings, an ion source assembly for use in a mass spectrometry system is disclosed, the assembly comprising a housing defining an ionization chamber configured to be disposed in fluid communication with a sampling orifice of a mass spectrometer system. The housing provides at least a first opening for coupling to a first electrospray probe configured to discharge a liquid sample into the ionization chamber at flow rates greater than a nanoflow range such that the discharged liquid forms a sample plume comprising a plurality of sample droplets. The first opening of the housing and the first electrospray probe are configured such that a longitudinal axis of the first electrospray probe is substantially orthogonal to a central axis of the sampling orifice. The assembly also comprises an elongate auxiliary electrode assembly extending from the housing to an electrically conductive distal end disposed in the ionization chamber. In various aspects, the electrically conductive distal end is positioned within the ionization chamber relative to the first electrospray probe and the sampling orifice such that, when coupled to a power supply, the electrically conductive distal end can generate an electric field within the ionization chamber to improve the desolvation of the sample plume and the transport of ions ejected from the sample plume into the sampling orifice. In some aspects, the ionization chamber may be maintained at about atmospheric pressure.

In accordance with various aspects of the present teachings, the electrically conductive distal end may be disposed at a variety of positions relative to the first electrospray probe and the sampling orifice. For example, in some aspects, the electrically conductive distal end may at least partially be disposed on the plane defined by the longitudinal axis of the first electrospray probe and the central axis of the sampling orifice. Additionally, in some example aspects, the first electrospray probe may be separated from the central axis of the sampling orifice along the longitudinal axis of the first electrospray probe by a first distance (e.g., in a range of 10-25 mm), while the electrically conductive distal end is disposed on or around the central axis, for example, within a second distance from the central axis that is within 70% of the first distance. In various related aspects, the electrically conductive distal end may optionally be less offset from the central axis, e.g., separated from the central axis by less than 50% of the first distance, by less than 30% of the first distance, by less than 10% of the first distance. In some example aspects, the electrically conductive distal end may be disposed substantially on the central axis of the sampling orifice. For example, the electrically conductive distal end may be disposed on the central axis (e.g., such that the central axis extends through the electrically conductive distal end).

Though in some aspects the protrusion of an electrospray emitter from the discharge end (also referred to herein as a discharge tip) of the first electrospray probe may be adjustable as in conventional ESI sources noted above, in some preferred aspects, the emitter of the first electrospray probe may be fixedly (non-adjustably) positioned relative to the discharge end of the first electrospray probe. Despite the lack of adjustability of the first electrospray probe, the electric field generated by the elongate auxiliary electrode assembly in accordance with various aspects of the present teachings may enhance the field gradient between the first electrospray probe's emitter and the sampling orifice, thereby improving ease-of-use by fixing the position of the emitter while nonetheless improving ionization of the sample plume, efficiency of the ion ejection, ion distribution, and/or transport of ions to the sampling orifice, as discussed in detail below. Additionally, in some aspects, the elongate auxiliary electrode may be coupled to the housing such that it is replaceable with a second electrospray probe configured to discharge a liquid sample at flow rates in a nanoflow range along the central axis of the sampling orifice, thereby providing a system with improved flexibility and improved optimization of ionization of various sample flow rates. In such aspects, the housing may comprise a second opening configured for removable coupling of the elongate auxiliary electrode assembly to the housing, wherein the second opening of the housing and the elongate auxiliary electrode assembly are configured such that the longitudinal axis of the elongate auxiliary electrode is substantially co-axial with the central axis of the sampling orifice. In related aspects, the second opening may be further configured for alternatively coupling a second electrospray probe (e.g., accommodating sample flow rates in a nanoflow regime), wherein the second opening of the housing and the second electrospray probe are configured such that a longitudinal axis of the second electrospray probe is positioned in the housing substantially co-axial with the central axis of the sampling orifice. As with the emitter of the first electrospray probe, the emitter of the second electrospray probe operating in a nanoflow range may extend out of the probe body at the discharge end by a fixed amount (i.e., by a distance which is not adjustable by a user).

The elongate auxiliary electrode assembly can have a variety of configurations and may be configured to interact with the sample plume and/or the electric field generated by the first electrospray probe in a variety of manners. As noted above, the elongate auxiliary electrode may be configured to couple to a power supply so as to generate an electric field within the ionization chamber to improve the desolvation of the sample plume and the transport of ions ejected from the sample plume into the sampling orifice. By way of example, in some aspects the electric field generated by the electrically conductive distal end may be configured to alter the electric field generated between the first electrospray probe and a curtain plate through which the sampling orifice extends. In some aspects, for example, the electric field generated by the electrically conductive distal end may be configured to change the electric field gradient in the vicinity of the sampling orifice.

With the distal end of the auxiliary electrode in the ionization chamber, the elongate auxiliary electrode assembly may be asymmetrically disposed relative to the sample plume. For example, in some aspects, the sample plume does not flow through the electrically conductive distal end. That is, the plume is transported by the electrically conductive distal end. In various aspects, the elongate auxiliary electrode assembly can have various effects on the desolvation of ions and the efficiency of ion sampling by the sampling orifice. By way of example, the elongate auxiliary electrode assembly may be configured to increase turbulence of the sample plume adjacent the sampling orifice (e.g., as the sample plume passes by the electrically conductive distal end), which may increase mixing of the sample plume and/or reduce charge shielding effects. Additionally or alternatively, in some aspects, the ion source assembly can comprise a heater configured to heat the ionization chamber such that at least a portion of the heated elongate auxiliary electrode assembly may act as a thermal mass that provides radiative heating adjacent the sampling orifice, which may also improve desolvation efficiency.

In various aspects, each of the first electrospray electrode and the elongate auxiliary electrode may be configured to be maintained at substantially the same DC voltage during discharge of the liquid sample from the first electrospray electrode into the ionization chamber. In such aspects, for example, the first electrospray electrode and the auxiliary electrode may be coupled to the same power source.

The electrically conductive distal end of the elongate auxiliary electrode can have a variety of shapes. By way of example, in some embodiments, the elongate auxiliary electrode assembly may be substantially cylindrical along a majority of its length and the electrically conductive distal end may terminate a substantially planar surface (e.g., a planar surface orthogonal to the central axis of the sampling orifice). Alternatively, in some aspects, the electrically conductive distal end of the elongate auxiliary electrode may be shaped as a concave surface. For example, the concave surface may be a parabolic cylinder and a spine of the parabolic cylinder may be parallel to the longitudinal axis of the first electrospray electrode.

In some aspects, the electrically conductive distal end may be positioned within the ionization chamber so as to interact with the sample plume and/or the electric field generated between the first electrospray probe and the curtain plate. In some example aspects, the distal most surface of the electrically conductive distal end may be separated from the longitudinal axis of the first electrospray by a distance in a range from about 1 mm to about 20 mm. Additionally, in some aspects, the distal end of the first electrospray probe may be separated from the central axis of the sampling orifice by a distance in a range from about 10 mm to about 25 mm. In various aspects, a width of the electrically conductive distal end may be approximately the same as the diameter of the sample plume at the central axis. For example, in some aspects the width of the electrically conductive distal end may be in a range of about 2 mm to about 10 mm (e.g., about 5-6 mm).

According to various embodiments, the elongate auxiliary electrode may be solid and comprise an electrically conductive surface along a majority of its body's length within the ionization chamber (in addition to the electrically conductive distal end). In some aspects, however, the elongate auxiliary electrode assembly may comprise an electrically conductive emitter (e.g., a capillary having an electrically conductive tip) that extends through a central bore in the electrically conductive distal end (and the probe body) for discharging a sample solution (e.g., a calibration solution) into the ionization chamber along the central axis of the sampling orifice.

Methods for ionizing a sample are also provided herein. For example, in accordance with certain aspects of the present teachings, a method of ionizing a sample includes providing a first electrospray probe configured for accommodating a sample flow rate in a range above a nanoflow range, the first electrospray probe being coupled to a first opening in a housing defining an ionization chamber disposed in fluid communication with a sampling orifice of a mass spectrometer system, wherein said first electrospray probe and said first opening are configured such that a longitudinal axis of the first electrospray probe is substantially orthogonal to a central axis of the sampling orifice. The method further comprises providing an elongate auxiliary electrode assembly that extends from the housing to an electrically conductive distal end disposed in the ionization chamber such that the electrically conductive distal end is disposed substantially on the central axis of the sampling orifice (e.g., the elongate auxiliary electrode assembly can extend along a longitudinal axis that is substantially co-axial with the central axis of the sampling orifice). While a liquid sample is discharged from the first electrospray electrode into the ionization chamber to form a sample plume comprising a plurality of sample droplets, the electrically conductive distal end of the elongate auxiliary electrode assembly may be energized to promote desolvation of the sample plume and the transport of ions ejected from the sample plume into the sampling orifice.

In some aspects, the housing may further comprise a second opening to which the elongate auxiliary electrode assembly is removably coupled, the method further comprising removing the elongate auxiliary electrode assembly from the second opening and coupling a second electrospray probe to the second opening. The second electrospray probe may accommodate sample flow rates in a nanoflow regime, for example, and the second opening of the housing and said second electrospray probe may be configured such that a longitudinal axis of the second electrospray probe is positioned in the housing substantially co-axial with the central axis of the sampling orifice. The method may also comprise discharging a liquid sample from the second electrospray electrode (e.g., toward the sampling orifice along a central axis thereof). In some related aspects, the method may further comprise plugging the second opening when one of the elongate auxiliary electrode assembly or the second electrospray probe is not coupled thereto. Likewise, in some aspects, the method may comprise plugging the first opening when the first electrospray probe is not coupled thereto.

In various aspects, the example methods may include heating the ionization chamber such that the elongate auxiliary electrode assembly provides radiative heating adjacent the sampling orifice to improve desolvation efficiency. Additionally or alternatively, the present methods may improve desolvation and/or transport of ions into the sampling orifice by the elongate auxiliary electrode assembly increasing turbulence of the sample plume adjacent the sampling orifice.

In some aspects, the ionization chamber can be maintained at about atmospheric pressure (e.g., during discharge of the liquid sample). In some aspects, the first electrospray electrode and the electrically conductive distal end of the elongate auxiliary electrode may be maintained at substantially the same DC voltage during discharge of the liquid sample from the first electrospray electrode. By way of example, the first electrospray electrode and the electrically conductive distal end of the elongate auxiliary electrode may be coupled to the same power supply.

In various aspects, the elongate auxiliary electrode assembly may further comprise an electrically conductive emitter extending through a central bore in the electrically conductive distal end, the method further comprising discharging a calibration solution from the electrically conductive emitter into the ionization chamber along the central axis of the sampling orifice. In such aspects, the emitter may be maintained at the same potential as the electrically conductive distal end, for example.

These and other features of the applicant's teaching are set forth herein.

BRIEF DESCRIPTION OF THE DRAWINGS

The foregoing and other objects and advantages of the invention will be appreciated more fully from the following further description, with reference to the accompanying drawings. The skilled person in the art will understand that the drawings, described below, are for illustration purposes only. The drawings are not intended to limit the scope of the applicant's teachings in any way.

DETAILED DESCRIPTION

Figure 1:
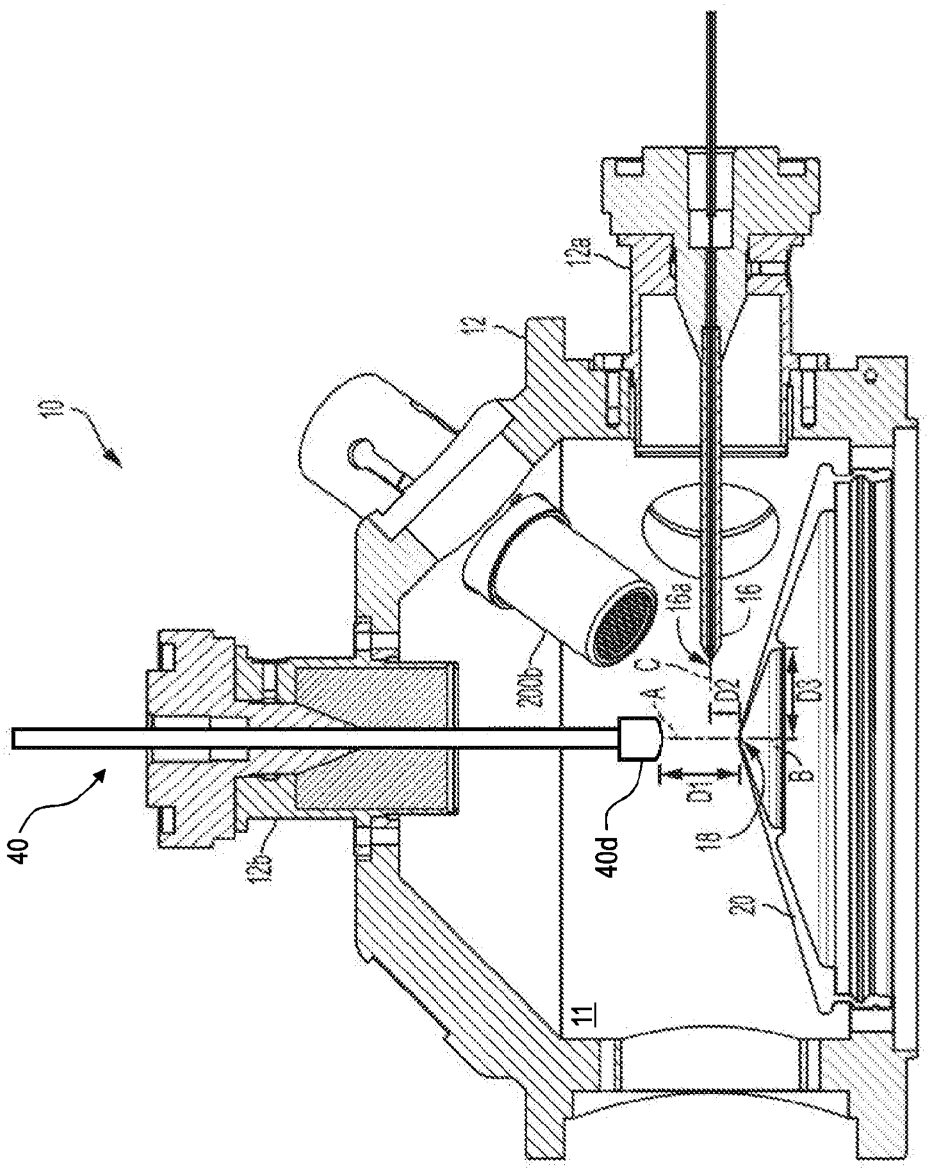
FIG. 1 schematically depicts an ion source according to an embodiment interfaced with a curtain plate of a mass spectrometer, where the ion source includes a first electrospray ion probe and an elongate auxiliary electrode assembly in accordance with various aspects of the applicant's teachings.

It will be appreciated that for clarity, the following discussion will explicate various aspects of embodiments of the applicant's teachings, while omitting certain specific details wherever convenient or appropriate to do so. For example, discussion of like or analogous features in alternative embodiments may be somewhat abbreviated. Well-known ideas or concepts may also for brevity not be discussed in any great detail. The skilled person will recognize that some embodiments of the applicant's teachings may not require certain of the specifically described details in every implementation, which are set forth herein only to provide a thorough understanding of the embodiments. Similarly it will be apparent that the described embodiments may be susceptible to alteration or variation according to common general knowledge without departing from the scope of the disclosure. The following detailed description of embodiments is not to be regarded as limiting the scope of the applicant's teachings in any manner.

As used herein, the terms "about" and "substantially equal" refer to variations in a numerical quantity that can occur, for example, through measuring or handling procedures in the real world; through inadvertent error in these procedures; through differences in the manufacture, source, or purity of compositions or reagents; and the like. Typically, the terms "about" and "substantially" as used herein means 5% greater or lesser than the value or range of values stated or the complete condition or state. For instance, a concentration value of about 30% or substantially equal to 30% can mean a concentration between 28.5% and 31.5%. The terms also refer to variations that would be recognized by one skilled in the art as being equivalent so long as such variations do not encompass known values practiced by the prior art.

As used herein, the terms "nanoflow range" or "nanoflow regime" refer to flow rates less than about 1000 nanoliters/min, e.g., in a range of about 1 nanoliter/min to about 1000 nanoliters/min.

As used herein, the term "fixedly positioned" as referring to an element indicates that the position of that element is not adjustable by a user.

The present teachings are generally related to systems incorporating an electrospray ion source and methods for operating the same. In accordance with various aspects of the present teachings, an ion source assembly for use in a mass spectrometry system is disclosed in which a housing defining an ionization chamber provides at least a first opening for coupling to a first electrospray probe configured to discharge a liquid sample into the ionization chamber and an elongate auxiliary electrode assembly extending from the housing to an electrically conductive distal end disposed in the ionization chamber such that the electrically conductive distal end is disposed substantially on the central axis of the sampling orifice. In various aspects, the elongate auxiliary electrode is generally configured to interact with the sample plume generated by the first electrospray probe and/or the electric field generated thereby to improve the desolvation of the sample plume and the transport of ions ejected from the sample plume into the sampling orifice. For example, in various aspects, the electrically conductive distal end of the elongate auxiliary electrode assembly may be configured to alter the electric field gradient generated between the first electrospray probe and a curtain plate in the vicinity of the sampling orifice. Additionally or alternatively, the elongate auxiliary electrode assembly may increase turbulence of the sample plume adjacent the sampling orifice so as to increase mixing of the sample plume and/or reduce charge shielding effects. In some further additional or alternative aspects, at least a portion of the heated elongate auxiliary electrode assembly may act as a thermal mass adjacent the sampling orifice so as to provide additional radiative heating to improve desolvation efficiency.

FIG. 1 schematically depicts an ion source 10 according to an embodiment of the present teachings that includes a housing 12 providing two openings or ports 12*a* and 12*b*, which as shown may be coupled to an auxiliary electrode assembly 40 and a first ion probe 16. The exemplary auxiliary electrode assembly 40 extends through the port 12*b* to an electrically conductive distal end 40*d* that is disposed within the ionization chamber 11 relative to the first ion probe 16 in order to interact with the sample plume generated the first ion probe 16 as otherwise discussed herein in order to provide improved ionization and ion sampling efficiency, thereby increasing sensitivity of the downstream mass spectrometry analysis.

Figure 7A:
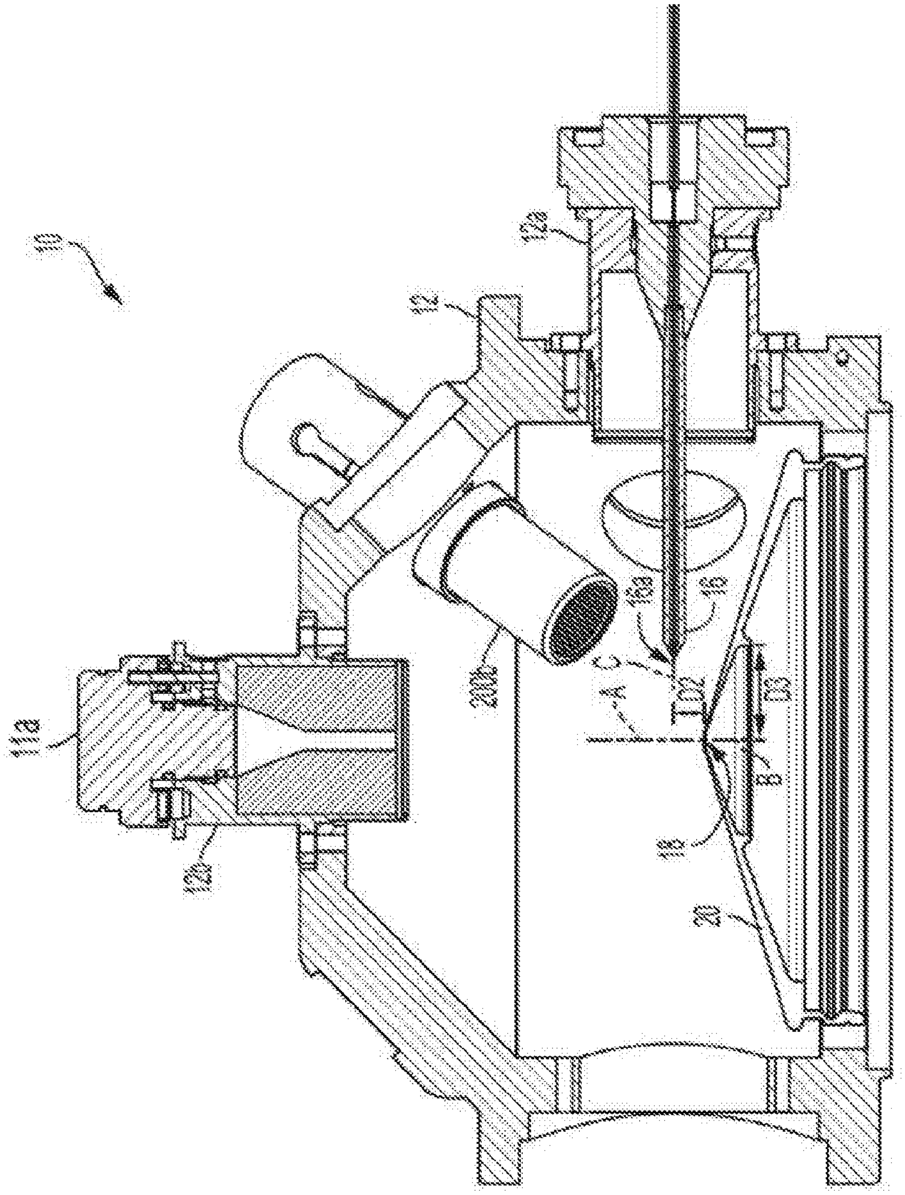
FIG. 7A schematically depicts the ion source of FIG. 1 in which the elongate auxiliary electrode assembly of FIG. 1 has been removed and the opening for receiving the elongate auxiliary electrode is plugged.
Figure 7B:
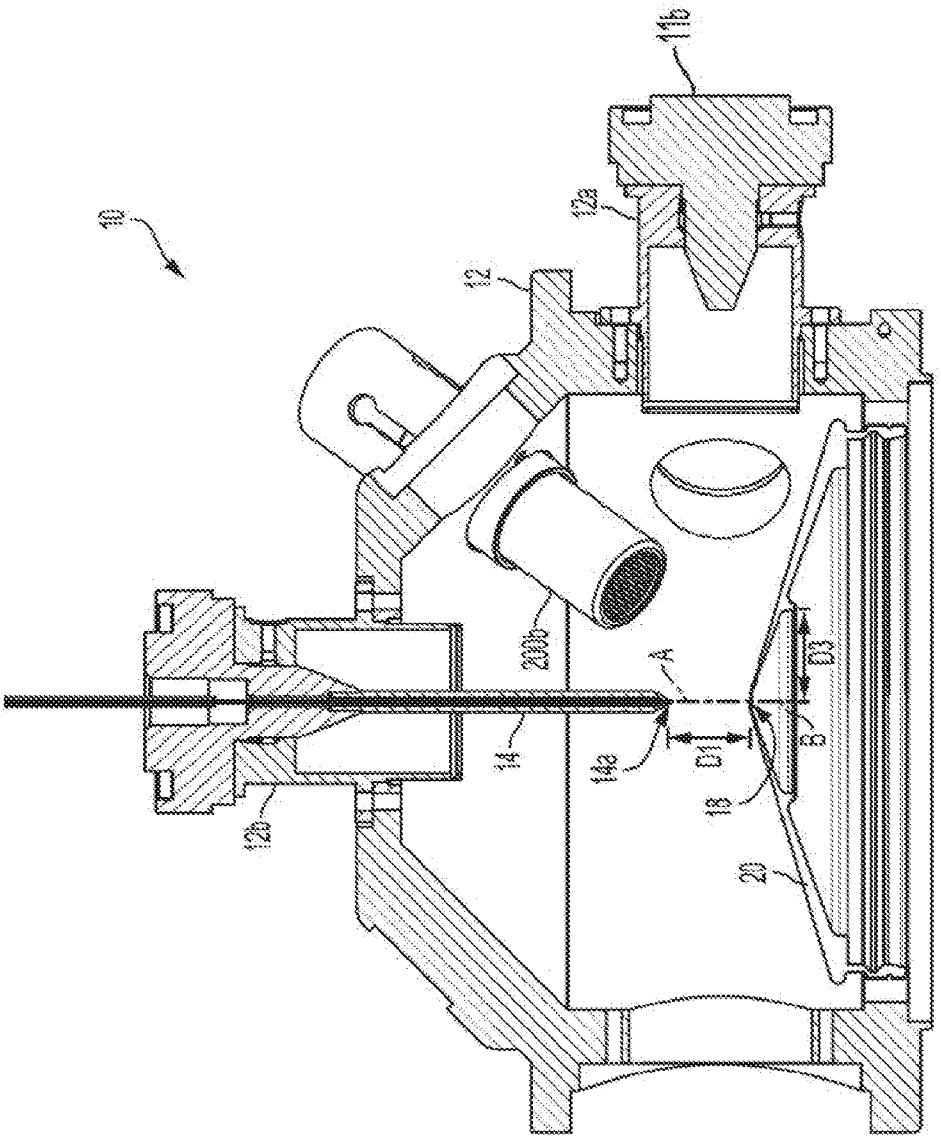
FIG. 7B schematically depicts the ion source of FIG. 1 in which the elongate auxiliary electrode assembly of FIG. 1 has been replaced with a second ion probe and the first ion probe has been removed and the opening is plugged.

As discussed in more detail below, in various aspects, each of the auxiliary electrode assembly 40 and the first ion probe 16 can be replaced with another ion probe and/or can be plugged. In other words, the ion source 10 can be configured to operate with both an ion probe 16 and an auxiliary electrode assembly 40 (FIG. 1), with two probes (FIG. 7C), or with only one of the ion probes and no auxiliary electrode assembly (FIGS. 7A and 7B). Accordingly, one advantage of ion sources in accordance with various aspects of the present teachings is that it allows for easy removal and replacement of the auxiliary electrode assembly and/or ion probes such that the ion source can be configured to operate in a variety of configurations, for example, depending on user preference or the experiments to be performed.

Referring again to FIG. 1, the first ion probe 16 is configured to 10 generate ions via electrospray ionization. As discussed in more detail below, the ion source can be incorporated in a variety of different mass spectrometers for generating ions. Further, as discussed in more detail below, the ion source 10 is configured to accommodate different flow rates of samples to be ionized, including flow rates in the nanoflow range as well as above the nanoflow range. By way of example, flow rates above the nanoflow range can be greater than 1000 nanoliters/min to about 3 milliliters/min.

As shown in FIG. 1, the first ion probe 16 is positioned relative to an aperture (sampling orifice 18) of a curtain plate 20 of a mass spectrometer in which the ion source 10 is incorporated such that at least some of the ions generated by the first ion probe 16 would pass through the sampling orifice 18 to reach the downstream components of a mass spectrometer, such as downstream mass analyzers. The first ion probe 16 is positioned such that its longitudinal axis (C) is substantially orthogonal to the sampling orifice's central axis (B). Though a variety of sample flow rates may be accommodated (e.g., in the nanoflow range or higher), the first ion probe 16 is most beneficially utilized for sample flow rates higher than the nanoflow range as the orthogonal positioning of the ion probe 16 relative to the orifice 18 of the curtain plate 20 can help ensure that sufficient number of ions enter the sampling orifice 18 while minimizing, and preferably eliminating, the passage of a large number of residual droplets. It will be appreciated that by reducing the entry of residual droplets through the sampling orifice 18, contamination of the downstream components of the mass spectrometer can be prevented. Additionally, because a large number of solvated ions can be due to endogenous and excipient compounds present in the sample liquid stream discharged from the first ion probe 16, interference with the analytes of interest during MS analysis may be reduced.

As shown in the exemplary embodiment of FIG. 1, the first ion probe 16 may be fixedly positioned relative to the sampling orifice 18 of the curtain plate 20 such that the positions of its nozzle from which liquid sample is discharged into the ionization chamber 11 is not adjustable relative to the orifice 18 of the curtain plate 20. More specifically, in this embodiment, an axial distance D2 between discharge nozzle 16*a* of the probe 16 and the orifice 18 of the curtain plate 20 is fixedly (non-adjustably) set at about 5.5 mm. More generally, the axial distance D2 can be in a range of about 2 mm to about 10 mm. In some cases, the axial distance D2 is set with a tolerance of 0.1 mm. Further, in this embodiment, the orthogonal distance D3 between the nozzle 16*a* of the first ion probe 16 and the central axis (B) of the sampling orifice 18 can be set fixedly (non-adjustably) at about 15.9 mm. More generally, the axial distance D3 can be in a range of about 10 mm to about 25 mm.

Likewise, in certain embodiments, the axial distance D1 between the distal most surface 43 of the distal end 40*d* of the auxiliary electrode assembly 40 and the sampling orifice 18 of the curtain plate 20 can be fixedly (non-adjustably) set such that the distance between the distal end 40*d* and the central axis (C) of the first ion probe 16 (i.e., D1-D2) is in a range of about 1 millimeters (mm) to about 20 mm (e.g., about 5.5 mm). In some embodiments, the axial distance between the distal end 40*d* of the auxiliary electrode assembly 40 and the sampling orifice 18 can be set with a tolerance of about 0.1 mm. As shown in FIG. 1, the electrically distal end 40*d* is at least partially disposed on the plane defined by the longitudinal axis of the first electrospray probe and the central axis of the sampling orifice, for example, so as to propel ions from the sample plume toward the orifice 18 for transport therethrough (and eventual MS-analysis).

Also shown in FIG. 1 is the distal end 40*d* of the auxiliary electrode assembly 40 being disposed on the central axis (B) of the sampling interface. However, in various aspects of the present teachings, the distal end may be offset from the central axis (B) as discussed below with respect to FIG. 13B. For example, the electrically conductive distal end may be positioned at a variety of positions within the ionization chamber relative to the ion probe 16 and the sampling orifice 18 such that, when coupled to a power supply, the electrically conductive distal end can generate an electric field within the ionization chamber to aid in the ejection and transport of ions in the sample plume toward the sampling orifice 18.

Figure 2C:
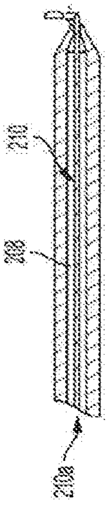
FIG. 2C is a partial schematic cross sectional view of the probe depicted in FIGS. 2A and 2B.
Figure 2A:
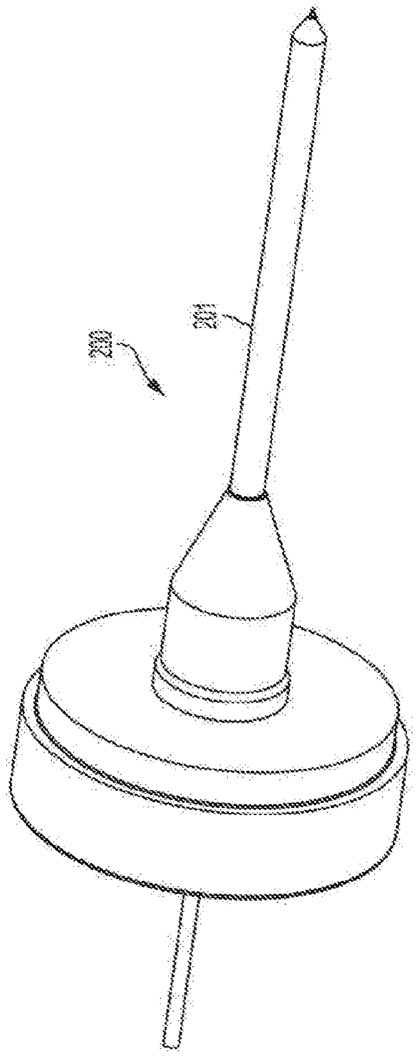
FIG. 2A is a schematic perspective view of an ion probe suitable for use in the ion source of FIG. 1 in accordance with various aspects of the applicant's teachings.
Figure 2B:
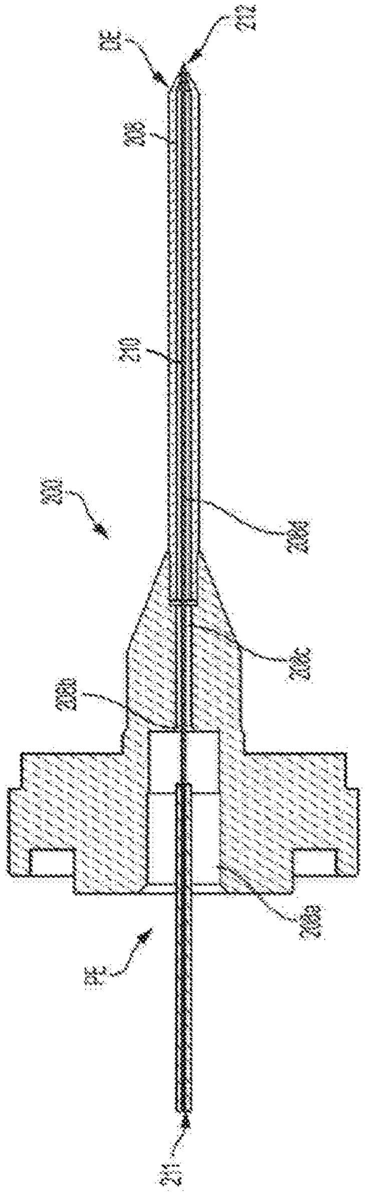
FIG. 2B is a schematic cross sectional view of the probe depicted in FIG. 2A.

The first ion probe 16 can be any suitable probe known in the art or hereafter developed that can be used for electrospray ionization (ESI) and modified according to the present teachings. Such suitable ESI probes include, for example, a probe in which the position of the electrospray emitter may be extended or adjusted relative to the discharge end of the first ion probe as in conventional ESI, in some preferred aspects, the emitter of the first ion probe may extend out of the probe body at the discharge end by a fixed amount (i.e., by a distance which is not adjustable by a user), thereby eliminating the need for some physical adjustment of the length of the emitter, which is often the most difficult and time-consuming aspects of ion source optimization. By way of example, in some exemplary aspects according to the present teachings, the first ion probe 16 can include an emitter that extends by a fixed amount beyond the nozzle. By way of example and with reference to FIGS. 2A-C, an exemplary ESI probe 200 suitable for use in the ion source 10 of FIG. 1 includes a probe body 201 that extends from a proximal end (PE) to a distal end (DE). As shown, the probe body 201 includes a channel 208 that extends from the proximal end (PE) to the distal end (DE) and in which an emitter 210 can be installed. The channel 208 includes an upper segment 208*a* that extends to a transition segment 208*b*, which in turn extends to lower segments 208*c* and 208*d*. In this embodiment, the portions of the probe body forming the upper segment 208*a* and the transition segment 208*b*, and the lower segment 208*c* of the channel 208 can be formed of a polymer, such as PEEK (poly ether ether ketone) while the portion of the probe body forming the lower segment 208*d* of the channel 208 can be formed of stainless steel. The emitter 210 extends beyond the distal end (DE) of the probe body (herein also referred to as the discharge end of the probe) by a fixed (non-adjustable) amount (D). The emitter 210 includes a channel 210*a* (e.g., a microchannel) that extends from an entrance end 211 to an ionization discharge end 212 of the emitter. The ionization discharge end 212 of the emitter extends out of the probe by a fixed (non-adjustable) amount D relative to the distal end (DE) of the probe body. The fixed distance D can be, for example, in a range of about 0.1 mm to about 2 mm. By way of non-limiting example, the fixed distance D for a probe accommodating sample flow rates in the nanoflow range can be about 0.9 mm, and the fixed distance D for the probe accommodating sample flow rates above the nanoflow range can be about 1.0 mm.

Figure 3A:
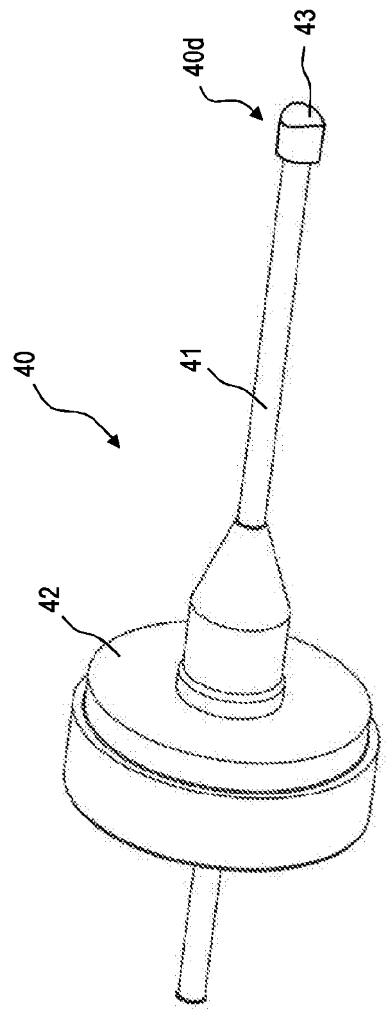
FIG. 3A is a schematic perspective view of an elongate auxiliary electrode assembly suitable for use in the ion source of FIG. 1 in accordance with various aspects of the applicant's teachings.
Figure 3B:
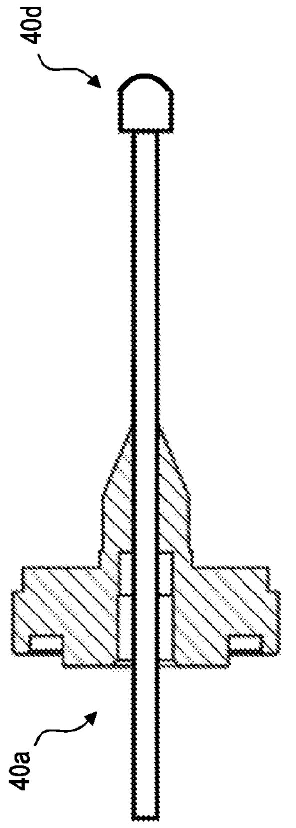
FIG. 3B is a schematic cross sectional view along the Y-axis of the elongate auxiliary electrode assembly depicted in FIG. 2A.
Figure 3C:
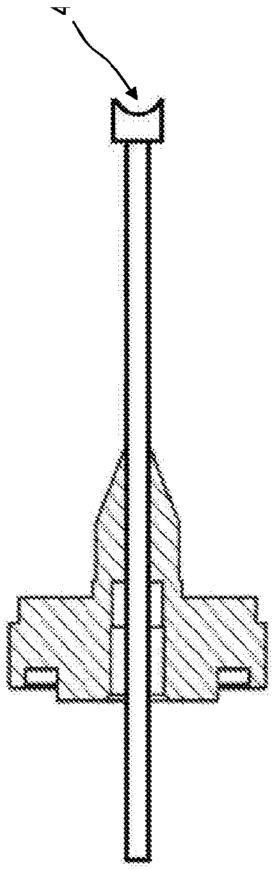
FIG. 3C is a schematic cross sectional view along the X-axis of the elongate auxiliary electrode assembly depicted in FIG. 2A.

With reference now to FIGS. 3A-C, the example auxiliary electrode assembly 40 of FIG. 1 is depicted in additional detail. As shown, the auxiliary electrode assembly includes an elongate body 41 that extends from a proximal end 40*a* to an electrically conductive distal end 40*d*. In accordance with various aspects of the present teachings, the elongate body 41 is configured to extend into the ionization chamber, for example, when the auxiliary electrode assembly 40 is coupled to the ion source housing (e.g., when collar 42 couples to port 12*b* of FIG. 1) such that the electrically conductive distal end 40*d* is disposed substantially on the central axis of the sampling orifice. In addition, in some aspects, the elongate body 41 may extend substantially along a longitudinal axis (A) that is also substantially co-axial with the central axis (B) of the sampling orifice when the auxiliary electrode assembly 40 is coupled to the ion source housing. However, as discussed below with reference to FIG. 13B, it will be appreciated that the elongate body may extend along an axis that is parallel but offset from the central axis of the sampling orifice.

As noted above and with reference again to FIGS. 3A-C, the distal end of the elongate body 41 comprises an electrically conductive electrode 40*d* at its distal end for generating an electric field adjacent the sampling orifice when coupled to a power source, though in some aspects, at least additional portions of the elongate body 41 may also be electrically conductive. By way of non-limiting example, the entire elongate body 41 (e.g., distal to the collar 42) may be solid as shown in FIG. 3B and may be formed of an electrically conductive material such as stainless steel such that the entire portion disposed within the ionization chamber functions as an electrode for adjusting the electric field generated between the discharge end of the first ion probe and the curtain plate. Though not shown, it will be appreciated that an electric potential may be applied to the elongate body 41 and its distal end 40*d* by coupling to one or more power sources (not shown). In some preferred embodiments, the electrode 40*d* of the elongate auxiliary electrode assembly 40 may be maintained at substantially the same potential as that applied to the first ion probe's emitter, and indeed, may in some aspect be coupled to the same power supply to reduce costs, for example. By way of non-limiting example, the discharge end of the first ion probe and the distal end 40*d* of the auxiliary electrode assembly can be maintained in a range of about 2000 V to about 6000 V (e.g., about 5 kV).

The distal end 40*d* of the auxiliary electrode assembly 40 can have a variety of configurations, but is generally configured to physically interact with the sample plume generated by the first electrospray probe and/or the electric field generated thereby to improve the desolvation of the sample plume and the transport of ions ejected from the sample plume into the sampling orifice. By way of example, the electrically conductive distal end 40*d* can have a variety of shapes and sizes. As shown in FIGS. 3A-3B, the distal end 40*d* comprises a portion of the elongate body 41 having a circular cross section of an increased diameter relative to the more proximal portion of the elongate body 41. In addition, the distal end 40*d* terminates in a concave surface 43 (e.g., as viewed from the sampling orifice). In the particular depicted embodiment, the surface 43 comprises a portion of a parabolic cylinder, which may be particularly beneficial in shaping the electric field within the ionization chamber and/or in interacting with the sample plume as otherwise discussed herein. With reference to FIG. 1 and FIG. 3C, it will be appreciated that the spine of the parabolic cylindrical surface 43 is parallel to the longitudinal axis (C) of the first ion probe 16 such that the sample plume is generally directed to pass by the surface 43 parallel to the direction of the surface's spine, with the wings of the distal end extending therefrom to further focus the ions from the sample plume toward the sampling orifice 18. The distal end 40*d* can have a variety of sizes, for example, it may be configured that the diameter (e.g., from wing to wing as best shown in FIG. 3C) may be approximately the diameter of the sample plume when it crosses the central axis (B) of the sampling orifice 18. For example, in some embodiments, the width of the electrically conductive distal end 40*d* (e.g., across the two wings) can be in a range of about 2 mm to about 10 mm.

Referring again to FIG. 1, the ion source 10 can further include one or more heaters that are coupled to the ion source housing 12 and are configured to heat the ionization chamber 11 to assist in the desolvation of the ions generated by the first ion probe 16, for example, preferably before those ions reach the sampling orifice 18 of the curtain plate 20. In the depicted embodiment, the ion source includes two heaters (only one heater 200*b* is shown) that are disposed non-coaxially relative to the first ion probe 16 and the auxiliary electrode assembly. In particular, the longitudinal axis C of the probe 16 is not along the longitudinal axes of either of the heaters 200*a* and 200*b*. Alternatively, the heaters can also be utilized as a gas source to provide temperature control over the path taken by the sample. The heaters can act as a simple gas source for cooling or a heated gas source for heating of the distal end (DE) of the probe body (e.g., the discharge tip of the emitter 212 in FIG. 2B), the sample path and the curtain plate 20. In some aspects, the heaters can be located in a plane parallel to the mirror plane (symmetry plane bisecting the angle between the first ion probe 16 and the auxiliary electrode assembly 40) of the two probes but offset by about 4 mm towards the first ion probe 16 (above the auxiliary electrode assembly 40). In certain aspects, this offset can offer wider control over the temperature for the first ion probe, which tends to have a higher flow rate than a second ion probe that can replace the auxiliary electrode assembly as discussed below), though the arrangement of the heater(s) can provide thermal control for both the probes and/or auxiliary electrode assembly, both sample paths, and both flow regimes. It will be appreciated that the orientation of the plane containing the heater(s) and its location may vary to accommodate different source geometries and sample flow regimes to achieve a desired level of thermal control over the environment to which the sample is exposed prior to its entry to the sampling orifice of the mass spectrometer. As discussed below with reference to FIG. 11, the auxiliary electrode assembly may also provide a thermal effect on the desolvation of the sample plume in accordance with various aspects of the present teachings. For example, the distal end 40*d* of the auxiliary electrode assembly may act as a thermal mass to increase and/or stabilize the temperature of the ionization chamber adjacent to the sampling orifice following absorption of heat produced by the heaters.

Figure 4A:
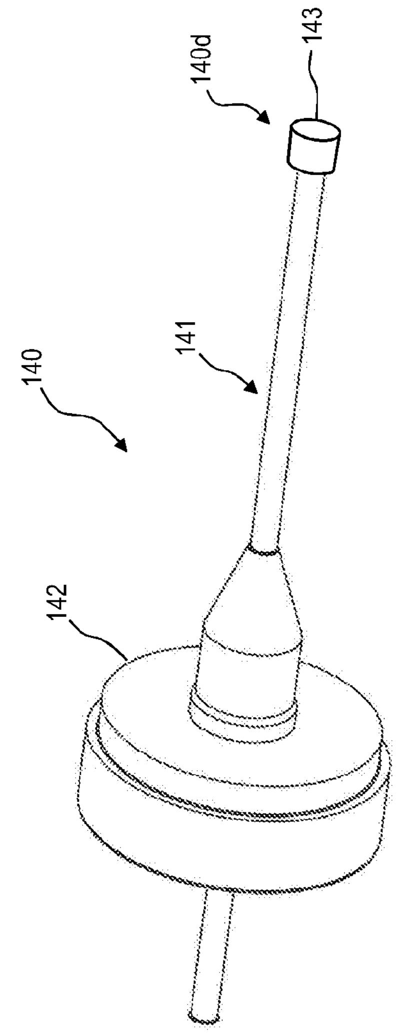
FIG. 4A is a schematic perspective view of another elongate auxiliary electrode assembly suitable for use in the ion source of FIG. 1 in accordance with various aspects of the applicant's teachings.
Figure 4B:
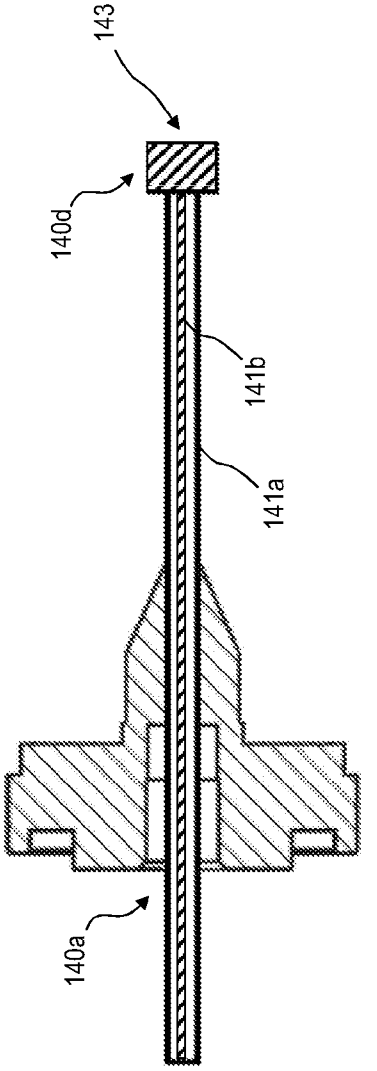
FIG. 4B is a schematic cross sectional view of the elongate auxiliary electrode assembly depicted in FIG. 4A.

With reference now to FIGS. 4A-B, another example auxiliary electrode assembly 140 suitable for use in the system of FIG. 1 is depicted. The auxiliary electrode assembly 140 is similar to the auxiliary electrode assembly 40 of FIGS. 3A-C but differs in that the electrically conductive distal end 140*d* instead terminates in a planar surface 143. Additionally, the auxiliary electrode assembly 140 differs in that the entire length of the elongate body 141 that is disposed within the ionization chamber does not function as an electrode as otherwise discussed herein. Rather, the elongate body comprises an insulating sheath 141*a* surrounding a wire 141*b* or other conductor that electrically couples the distal end 140*d* to a power supply (not shown). In this manner, the electrically conductive distal end 140*d* may function like a point source near the sampling orifice and substantially on the central axis (B) thereof. Though the planar surface 143 would be orthogonal to the central axis of the sampling orifice 18 if coupled to port 12*b* of the housing 12 as oriented in FIG. 1, it will be appreciated that the shape of the distal most surface 143 may be configured as such regardless if the longitudinal axis of body 141 is co-axial with the central axis as in FIG. 1 (e.g., axis (A) of the elongate electrode assembly 40 is not offset from central axis (B) of the sampling orifice 18). In this manner, the position of the source of the auxiliary electric field may remain substantially the same, while the location from the housing 12 from which the body extends 143 can be adjusted.

The following examples and data are provided for further elucidation of various aspects of the present teachings, and are not intended to necessarily provide the optimal ways of practicing the present teachings or the optimal results that can be obtained.

With reference first to Table 1 below, samples containing various analytes in a 50/50/0.1 solution water/methanol/formic acid (percent by volume) were ionized with an ion source as shown in FIG. 1, with and without the use of an auxiliary electrode assembly as shown in FIG. 3A (except the distal electrode had a planar distal surface as in FIG. 4B disposed 11 mm from the sampling orifice of a 6500 Triple Quad mass spectrometer marketed by SCIEX). The ionization chamber was maintained at atmospheric pressure and the desolvation heaters were set at 200° C., 500° C. and 700° C. for the flow rates of 5 μL/min, 60 μL/min, and 210 μL/min, respectively. As shown in Table 1 below, each of the samples in which the auxiliary electrode assembly was energized at the same voltage as the discharge tip of the ion probe exhibited a gain relative to the same sample without utilizing the auxiliary electrode assembly. This substantial increase in detected ion intensity was demonstrated at a variety of sample flow rates (5 μL/min, 60 μL/min, and 210 μL/min). The average gain was 1.78, 1.95, and 1.87, respectively. Without being bound by any particular theory, it is believed that the gains resulted from the substantially improved desolvation, mixing, and transport of the sample plume and ions ejected therefrom, which is conventionally more difficult at higher volumetric flow rates due to the amount of solvent to be desolvated.

TABLE 1

Auxiliary electrode assembly having blunt tip disposed 11 mm from curtain plate

| | Gain at 5 μL/min infusion | Gain at 60 μL/min infusion | Gain at 210 μL/min infusion (50/50/0.1) |
|---|---|---|---|
| Naproxen | 1.56 | 1.70 | 1.56 |
| Prazepam | 1.78 | 1.84 | 1.79 |
| Scopolamine | 1.79 | 1.94 | 1.87 |
| Aldosterone | 1.80 | 2.39 | 1.91 |
| Haloperidol | 1.86 | 1.95 | 1.93 |
| Glufib | 1.87 | 1.90 | 2.15 |
| Average Gain | 1.78 | 1.95 | 1.87 |

With reference to Table 2 below, the same samples containing various analytes in a 50/50/0.1 solution water/methanol/formic acid (percent by volume) were ionized with an ion source as shown in FIG. 1, with and without the use of an auxiliary electrode assembly as shown in FIG. 3A (i.e., a parabolic distal surface disposed 11 mm from the sampling orifice of a 6500 Triple Quad mass spectrometer marketed by SCIEX). The ionization chamber was maintained at atmospheric pressure with desolvation heaters set at 300° C. As shown in Table 2 below, the average gain for each compound at 10 μL/min was even greater than in Table 1 above at any of 5 μL/min, 60 μL/min, and 210 μL/min. The overall average gain was 2.30 across all compounds.

TABLE 2

Auxiliary electrode assembly having parabolic tip disposed 11 mm from curtain plate (infusion at 10 μL/min., T = 300° C.)

| | ESI Probe 1 (kcps) | ESI Probe 1 + Aux. Electrode (kcps) | Gain |
|---|---|---|---|
| Naproxen | 605 | 1181 | 1.95 |
| Prazepam | 265 | 599 | 2.26 |
| Scopolamine | 63 | 146 | 2.31 |
| Aldosterone | 481 | 970 | 2.02 |
| Haloperidol | 314 | 774 | 2.47 |
| Glufib | 339 | 936 | 2.76 |
| Average Gain | | | 2.30 |

Figure 5A:
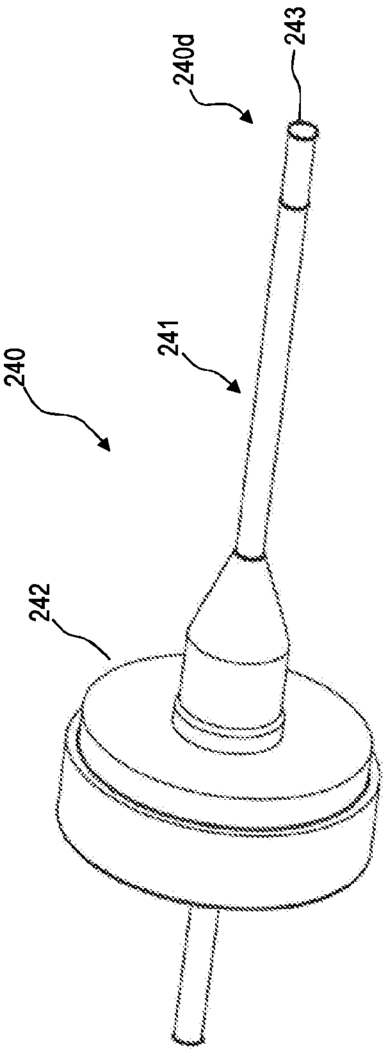
FIG. 5A is a schematic perspective view of another elongate auxiliary electrode assembly suitable for use in the ion source of FIG. 1 in accordance with various aspects of the applicant's teachings.
Figure 5B:
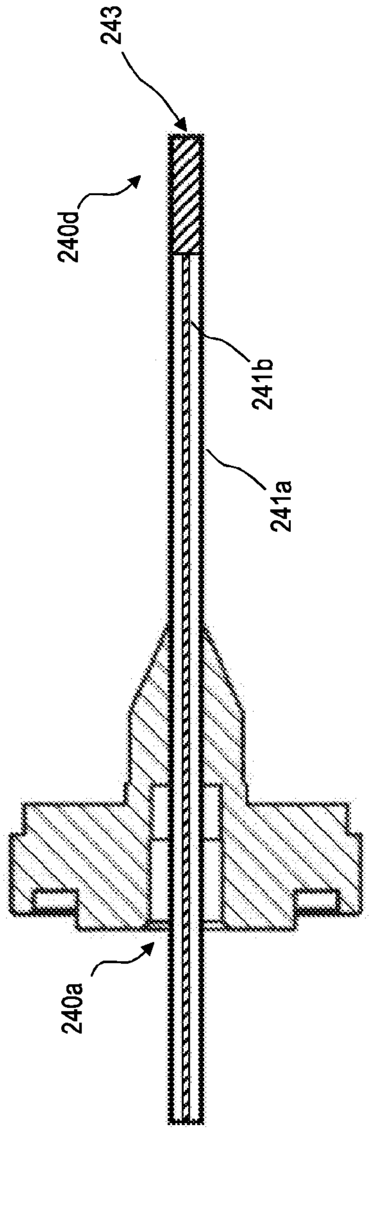
FIG. 5B is a schematic cross sectional view of the elongate auxiliary electrode assembly depicted in FIG. 5A.

With reference now to FIGS. 5A-B, another example auxiliary electrode assembly 240 suitable for use in the system of FIG. 1 is depicted. The auxiliary electrode assembly 240 is similar to the auxiliary electrode assembly 140 of FIG. 4A-B in that it also includes an elongate body 241 comprising an insulating sheath 241*a* surrounding a wire 241*b* or other conductor that electrically couples the distal end 240*d* to a power supply (not shown). The auxiliary electrode assembly 240 differs from that of FIG. 4A-B in that the electrically conductive distal end 240*d* exhibits a circular cross-section of the same diameter as the more proximal portion of the elongate body 241.

Figure 6A:
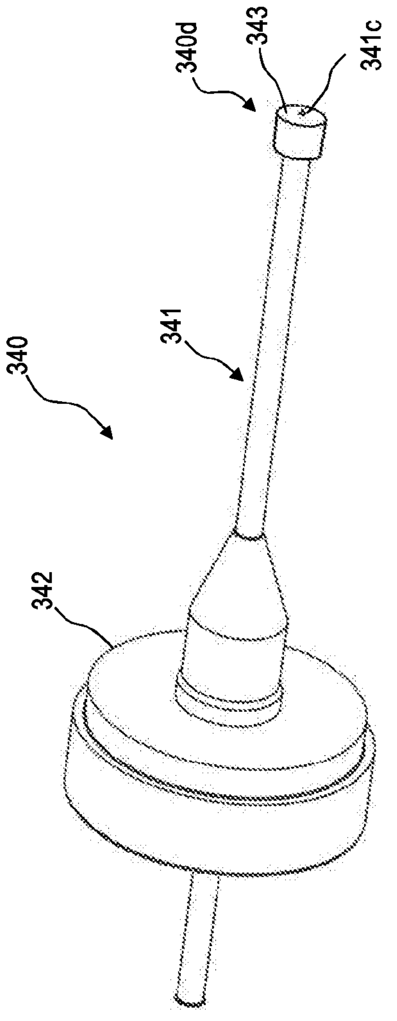
FIG. 6A is a schematic perspective view of another elongate auxiliary electrode assembly suitable for use in the ion source of FIG. 1 in accordance with various aspects of the applicant's teachings.
Figure 6B:
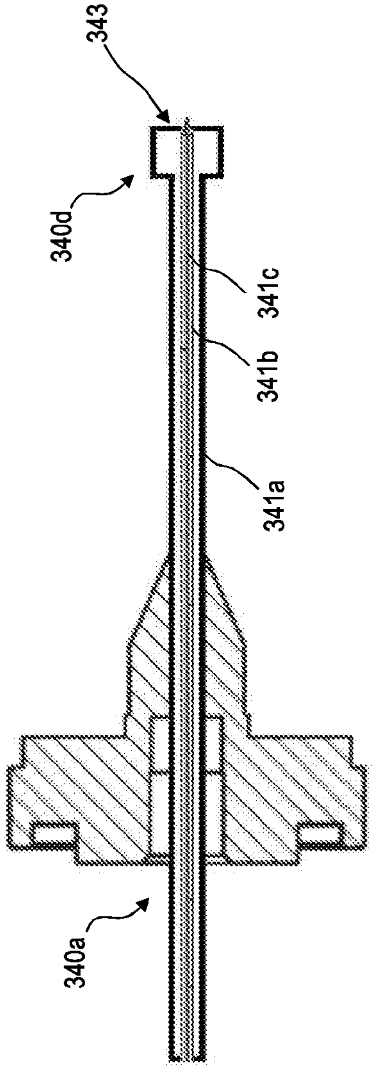
FIG. 6B is a schematic cross sectional view of the elongate auxiliary electrode assembly depicted in FIG. 6A.

With reference now to FIGS. 6A-B, another example auxiliary electrode assembly 340 suitable for use in the system of FIG. 1 is depicted. The auxiliary electrode assembly 340 is similar to the auxiliary electrode assembly 40 of FIGS. 3A-C but differs in that the electrically conductive distal end 340*d* instead terminates in a planar surface 343. Additionally, the auxiliary electrode assembly 340 differs in that the elongate body 341 defines a central channel 341*b* within an outer sheath 341*a* and within which an emitter 341*c* can be installed. The emitter 341*c* extends distally through a bore in the surface 343 so as to provide for discharge of a fluid (e.g., calibration solution) while the discharge end of emitter 341*c* and the distal electrode 340*d* are energized. In such aspects, the auxiliary electrode assembly 340 can additionally enable calibration of the ion source and/or mass spectrometry system, including at nanoflow flow rates of the calibration solution due to the orientation of the elongate auxiliary assembly (e.g., the longitudinal axis of the body 341 is coaxial with the central axis of the sampling orifice such that small volumetric flow rates of calibration solution may be discharged directly thereat). Additionally, in some related aspects, the central channel 341*b* may be disposed in fluid communication with a gas source (not shown) so as to deliver compressed gas to help with the calibrant nebulization/discharge when the calibration takes place.

As above, the distal electrode 340*d* can have a variety of sizes, for example, it may be configured that the diameter may be approximately the diameter of the sample plume when the sample plume crosses the central axis (B) of the sampling orifice 18. For example, in some embodiments, the width of the electrically conductive distal end 340*d* can be in a range of about 2 mm to about 10 mm (e.g., about 3 mm). Additionally, the emitter 341*c* may have a width of about 0.3 mm and may protrude from the surface 343 by a distance of about 0.5 mm, by way of non-limiting example.

It will also be appreciated that the channel 341*b* may be coupled to a gas source (not shown), such that nebulizer gas can be provided from the distal end 340*d* of the auxiliary electrode assembly 340 (with or without the emitter 341*c*) so as to shape and/or contain the fluid discharged from the emitter (e.g., direct a sample plume toward the sampling orifice) or may shape the sample plume generated by the first ion probe to further assist in ion transport to the sampling orifice. Even without the nebulizer gas, however, it is believed that the elongate auxiliary electrode assembly, which protrudes from the housing and terminates at a distal end within or near the sample plume from the first ion probe 16 may increase turbulence of the sample plume adjacent the sampling orifice (e.g., as the sample plume passes by the electrically conductive distal end), which may increase mixing thereof and/or reduce charge shielding effects, thereby increasing the efficiency of desolvation, ionization, and/or sampling.

Figure 7C:
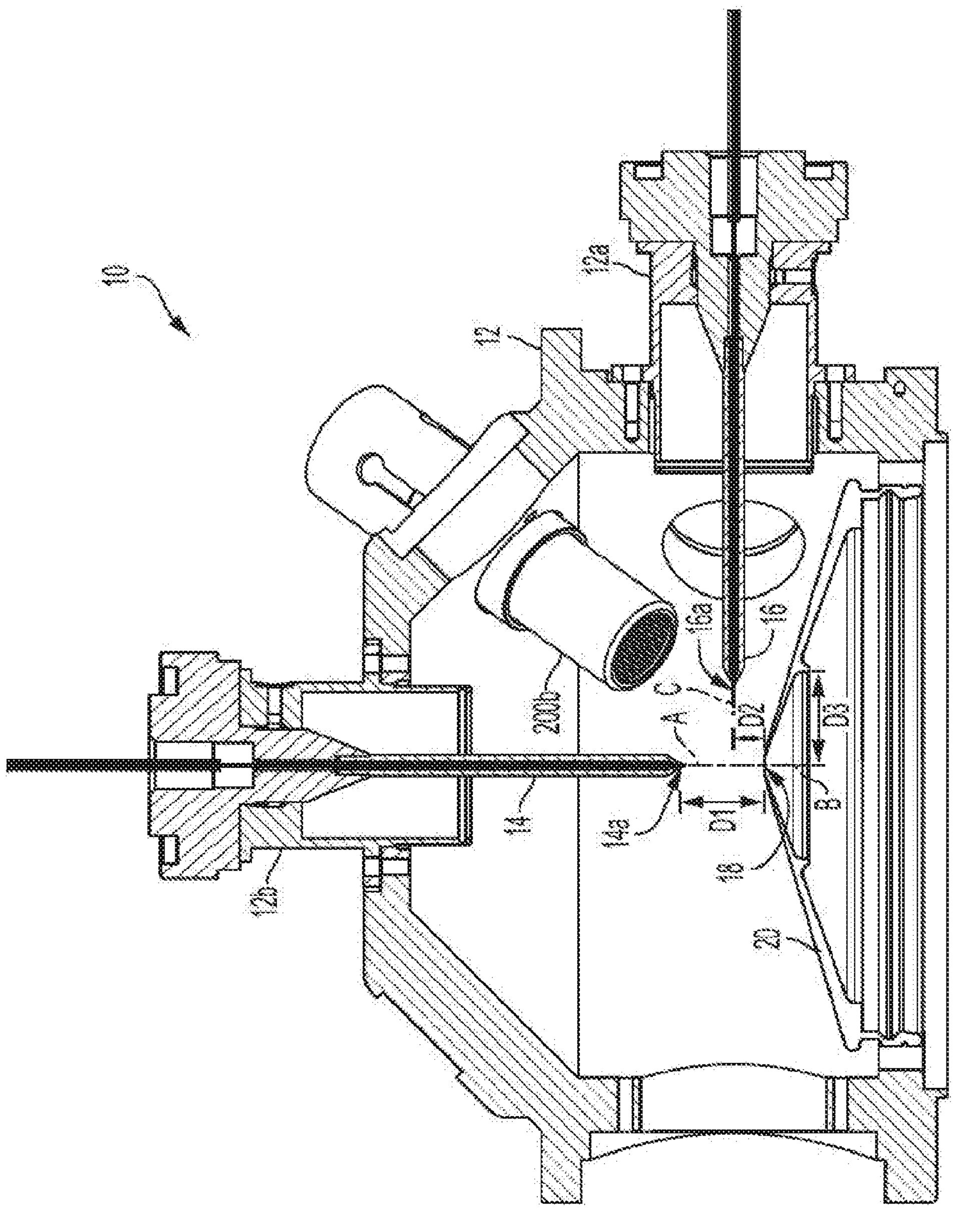
FIG. 7C schematically depicts the ion source of FIG. 1 in which the elongate auxiliary electrode assembly of FIG. 1 has been replaced with a second ion probe.

As noted above with respect to FIG. 1, each of the auxiliary electrode assembly 40 and the first ion probe 16 can be replaced with another ion probe and/or can be plugged if the corresponding port is not in use. With reference now to FIGS. 7A-C, various configurations of the ion source 10 are depicted in which at least one the first ion probe and the auxiliary electrode assembly has been removed relative to the configuration shown in FIG. 1. In particular, FIG. 7A depicts a configuration of the ion source 10 in which the first ion probe 16 is coupled to the ion source housing 12 via the port 12*a* and a plug 11*a* is employed to close off the port 12*b* (e.g., after removal therefrom of the auxiliary electrode assembly 40). That is, the ion source 10 can be configured to operate with only the first ion probe 16, depending for example, on the preference of the user or the particular experiment. By way of example, such a configuration can be useful in applications in which flow rates only above the nanoflow range are needed but the temperature of the ionization chamber may be maintained sufficiently high as to provide efficient desolvation and ion sampling even without the auxiliary electrode assembly 40.

FIG. 7B depicts a configuration of the ion source 10 in which a second ion probe 14 has replaced the auxiliary electrode assembly 40 within port 12*b* and a plug 11*b* is employed to close off the port 12*a* (e.g., after removal therefrom of the first ion probe 16). In this manner, the ion source 10 is configured to operate with only the second ion probe 14. It will be appreciated that the second ion probe 14 can be similar to the first ion probe 16 in that it is also configured to generate ions via electrospray ionization. However, whereas the first ion probe 16 may preferably accommodate sample flow rates above the nanoflow range due to its orthogonal orientation relative to the central axis (B) of the sampling orifice 18, the second ion probe 14 may be better suited when sample flow rates only in the nanoflow range are needed (e.g., the second ion probe 14 is coupled to a liquid chromatography (LC) column to receive a sample therefrom). As shown in FIG. 7B, for example, the second ion probe 14 is positioned relative to the sampling orifice 18 such that its longitudinal axis (A) is substantially co-axial with the central axis (B) passing through the sampling orifice 18 and perpendicular to a plane thereof. In this manner, the ions generated by the second ion probe 14 can be readily received by the sampling orifice 18. In other words, the sampling orifice 18 can receive the ions generated by the second ion probe 14 at a rate substantially equal to the rate at which those ions are generated. When operating in the nanoflow regime, additional desolvating components can be located downstream from the curtain plate aperture, as described in U.S. Pat. No. 7,098,452. Hence, the axial positioning of the ion probe 14 relative to the aperture 18 results in high sensitivity due to the passage of a large fraction of ions generated by the probe 14 to the downstream components of a mass spectrometer in which the ion source is incorporated without, or at least with minimal, adverse effects on those downstream components.

FIG. 7C depicts a configuration of the ion source 10 in which a second ion probe 14 has replaced the auxiliary electrode assembly 40 within port 12*b* while the first ion probe remains within port 12*a*. In such a configuration of FIG. 7C, the ion source may operate with either or both of the ion probes depending on the sample flow rate regime, and may provide a number of advantages. In particular, the fixation of the emitter relative to the probe in which the emitter is incorporated such that the emitter extends beyond the probe's discharge tip by a fixed (non-adjustable) length can be advantageous. In conventional ion sources in which the protrusion of an emitter beyond the discharge tip of a probe can be adjusted by a user, the protrusion adjustment of the emitter can be quite tedious especially for flow rates above the nanoflow regime. In particular, in a conventional electrospray ion source, as the flow rate of a sample introduced into the ion source's probe changes, the flow rate of a nebulizer gas introduced into the probe as well as the heat generated by one or more heaters disposed in a chamber to which the ion source is coupled are adjusted to optimize ionization and desolvation of the sample. Further, the length of protrusion of the emitter beyond the discharge tip of the probe is also adjusted to further optimize the ionization of the sample. Moreover, in many such conventional systems, the position of the discharge tip of the probe relative to the heater(s) and an inlet port of the mass spectrometer in which the ion source is incorporated can also be adjusted. Significantly, in conventional ion sources, different flow rates require different protrusion lengths of the emitter beyond the discharge tip of the probe. The optimization of the ionization process via adjustment of the emitter relative to the probe's tip can be difficult and typically requires a great deal of experience to accomplish. In contrast, in an ion source according to some aspects of the present teachings, different probes are employed for flow rates in and above the nanoflow regime. The use of different probes for accommodating such different flow rates allows fixing the emitter of an ion source relative to its probe, and particularly fixing the length by which the emitter protrudes beyond the probe's discharge tip. The use of different ion probes accommodating different sample flow rates and each having an emitter that is fixedly positioned within the probe advantageously eliminates the need for a user to adjust the emitter's position while allowing the use of different sample flow rates.

Figure 8:
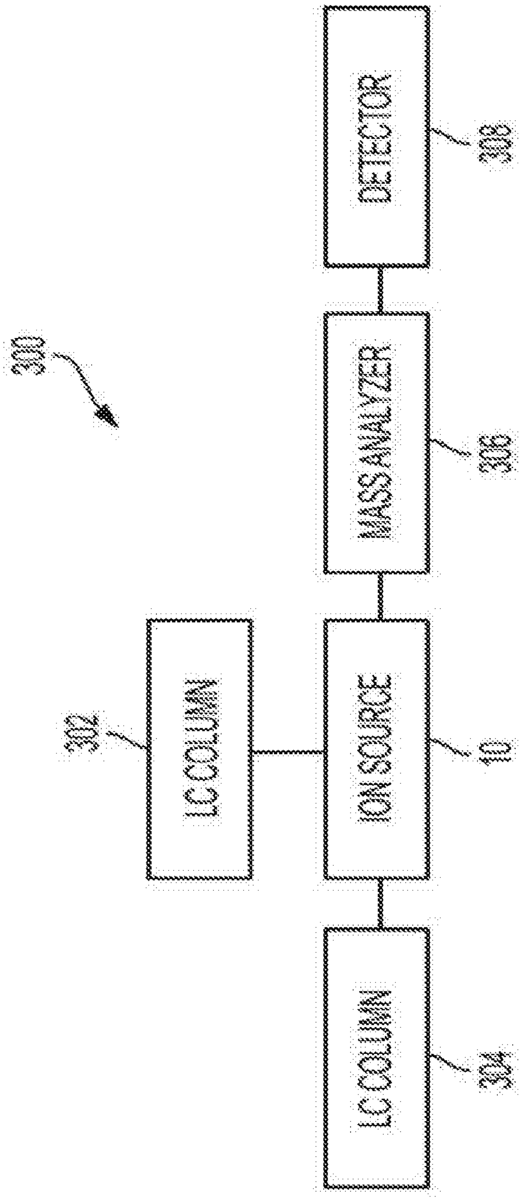
FIG. 8 schematically depicts an example mass spectrometer system in which an ion source may be employed according to various aspects of the applicant's teachings.

An ion source according to the present teachings can be incorporated in a variety of different mass spectrometers. By way of example, FIG. 8 schematically depicts a mass spectrometer 300 in which the ion source 10 of FIG. 1 is incorporated. As discussed above, the ion source 10 may be configured to include an auxiliary electrode 40 and/or at least one of two ion probes 14 and 16 (not shown in this figure), one of which is configured to accommodate sample flow rates in the nanoflow regime and the other is configured to accommodate sample flow rates above the nanoflow regime.

In the embodiment depicted in FIG. 8, the ion source 10 configured as in FIG. 7C may be coupled to two LC columns 302 and 304, one which is configured to introduce a sample into the ion probe 14 at flow rates in the nanoflow range and the other is configured to introduce a sample into the ion probe 16 at flow rates above the nanoflow range. Each of the ion probes 14/16 can generate ions corresponding to at least one constituent of the sample introduced therein. Alternatively, should additional ion signal, improved desolvation, and/or increased ionization efficiency be needed, the ion probe 14 may be removed and replaced with an auxiliary electrode assembly as shown in the configuration of FIG. 1.

The desolvated ions are introduced into a downstream mass analyzer 306, e.g., via the orifice of a curtain plate of the analyzer as discussed above, which can analyze the ions based on their mass-to-charge (m/z) ratios. The ions passing through the mass analyzer can be detected by an ion detector 308. A variety of mass analyzers can be employed. For example, the mass analyzer 306 can be one or more quadrupole analyzers, time-of-flight analyzers, differential ion mobility analyzers, and any other mass analysis or ion mobility device. Further, the ion detector can be, for example, any combination of electron multiplier/electron multiplier-HED or other suitable detectors. In some embodiments, the mass analyzer 306 is a tandem analyzer that provides multiple stages of mass analysis. By way of example, the mass analyzer 306 can be an MS/MS analyzer having two quadrupole mass analyzers and a collision cell disposed between two quadrupole mass analyzers. In some embodiments, such an MS/MS analyzer can be operated in a multiple reaction monitoring (MRM) mode. For example, in such a mode, the first quadrupole analyzer can be configured to select precursor ions within a specified range of m/z ratios. The selected precursor ions can enter the collision cell and be fragmented due to collisions with a background gas. The second quadrupole mass analyzer can be configured to select fragment ions within a specified range of m/z ratios. In this manner, precursor/product ion pairs can be selectively detected.

In use, a sample can be introduced into one of the LC columns 302/304 and the eluant can be introduced into the ion probe that is fluidly coupled to that LC column. The ion probe can cause ionization of at least one constituent of the eluant received from the LC column. The ions can then be introduced into the downstream mass analyzer 306 to be analyzed based on their mass-to-charge (m/z) ratios. The ions passing through the mass analyzer 306 can be detected by the detector 308. In some embodiments, one probe can be attached and a plug can seal the other port (as in FIGS. 7A and 7B). In some alternative embodiments, one probe can be attached to a port 12*a* and an auxiliary electrode assembly can be coupled to the other port 12*b* (as in FIG. 1).

In some embodiments, the electrical resistances of the auxiliary electrode assembly, the ion probes, and/or the plugs employed to close off the ports when probes are not inserted can be employed to identify which assembly, if any, is coupled to the housing. Further, such identification of the assembly coupled to the housing can be utilized to supply appropriate power to the appropriate assembly. By way of example, in some such embodiments, a plug employed to close off a non-functional port (i.e., a port in which an auxiliary electrode assembly or probe is not inserted) can provide a short circuit of vanishing (zero) resistance. Further, the probe accommodating flow rates in the nanoflow range can be provided with an identification resistance (R1) (e.g., in a range of about 0 Ohms to about 50 kOhms (such as 2.43 kOhms)), the probe accommodating flow rates above the nanoflow range can be provided with a different identification resistance (R2) (e.g., in a range of about 0 Ohms to about 50 kOhms (such as 1.47 kOhms)), and the auxiliary electrode assembly can be provided with an identification resistance (R3) that is different than R1 and R2. Likewise, the plugs 11*a* and 11*b* can each be provided with a distinct identification resistance. The resistances of the assemblies and/or plugs can be connected in series. If the probe accommodating flow rates in the nanoflow range is inserted in one port of the housing with the other port closed off with a particular plug, the measured resistance will indicate the particular assembly and/or plug combination that is coupled to the housing. Further, if neither probe nor plugs are coupled to the housing at each location, the measured resistance will indicate an open circuit such that a controller in communication with a device measuring the resistances will recognize that no assembly is coupled to the housing at each port and will inhibit application of voltages intended for the assemblies. Assembly recognition is important because the software can set reasonable default values and typical high flow settings are sufficiently severe to damage a nanospray tip, by way of example.

Figure 9:
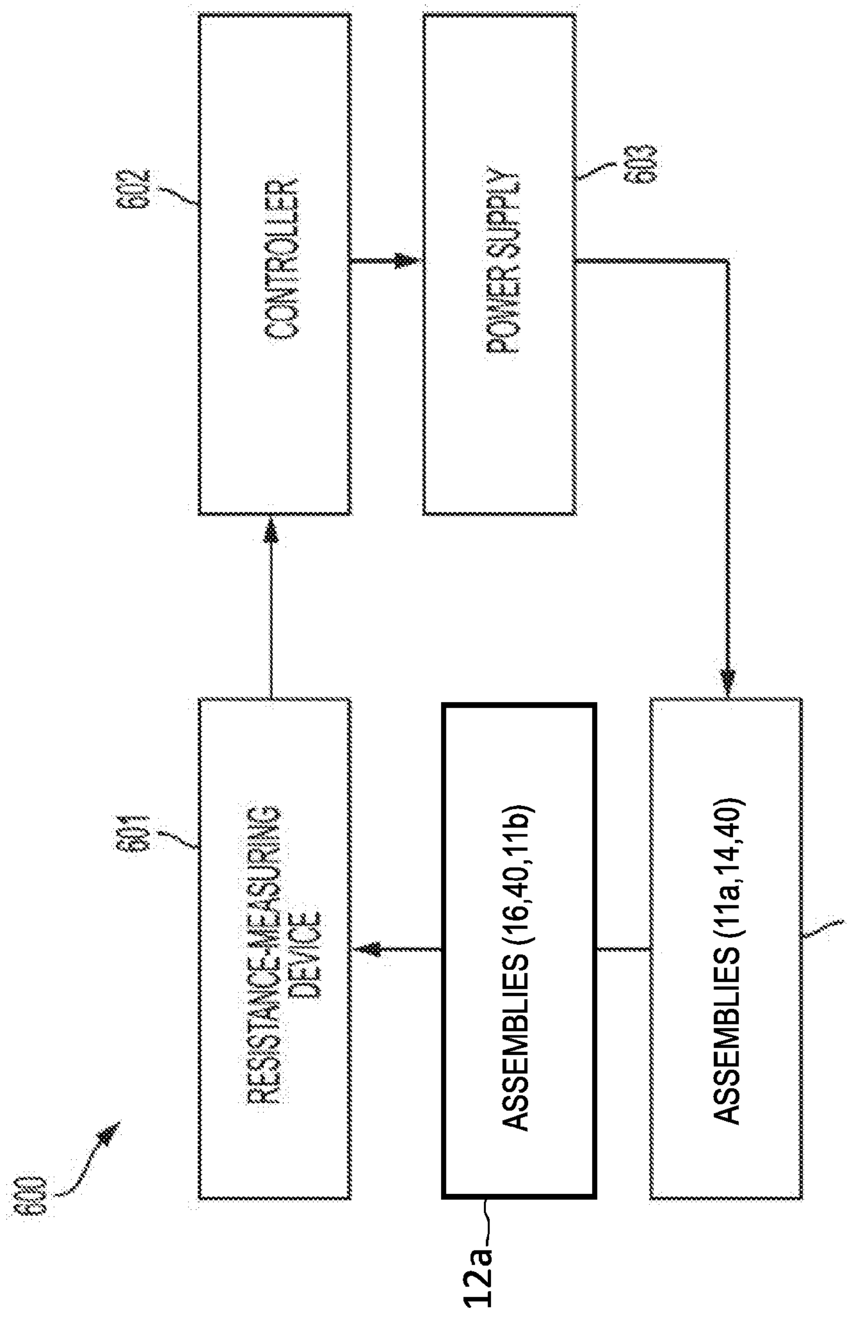
FIG. 9 schematically depicts a system for identifying which ion probe or auxiliary electrode, if any, is coupled to the housing of an ion source in accordance with various aspects of the applicant's teachings.

FIG. 9 schematically depicts a system 600 for identifying which assembly (e.g., auxiliary electrode assembly 40, first ion probe 16, second ion probe 14), if any, is coupled to the housing, and controlling the application of an appropriate voltage, if any, to the probe that is coupled to the housing. The system 600 includes a resistance-measuring device 601 for measuring the resistance across the openings in the housing 12*a*/12*b*. As noted above, if a particular assembly and/or plug combination is coupled to the housing, the resistance value measured by the resistance-measuring device 601 will indicate the particular assembly and/or plug combination. Further, if neither assembly nor plugs are coupled to the housing at one of the locations, the resistance-measuring device will measure an open circuit.

With continued reference to FIG. 9, a controller 602 receives the measured resistance values from the resistance-measuring device 601. The controller in turn controls a power supply 603 for adjusting voltages applied to the probe(s). For example, if the measured resistance value received by the controller indicates that only the probe accommodating flow rates in the nanoflow range is coupled to the housing, the controller 602 can cause the power supply 603 to apply an appropriate voltage to that probe (e.g. 3500 V). On the other hand, if the measured resistance value received by the controller indicates that only the probe accommodating flow rates above the nanoflow range is coupled to the housing, the controller 602 can cause the power supply 603 to apply an appropriate voltage to that probe (5500 V). Further, if the measured resistance value received by the controller indicates either a short circuit or an open circuit, the controller 602 can inhibit the power supply 603 from applying any voltages to the probes. The controller can also set default values for source heaters and gas flow rates based upon the measured resistance.

Figure 10B:
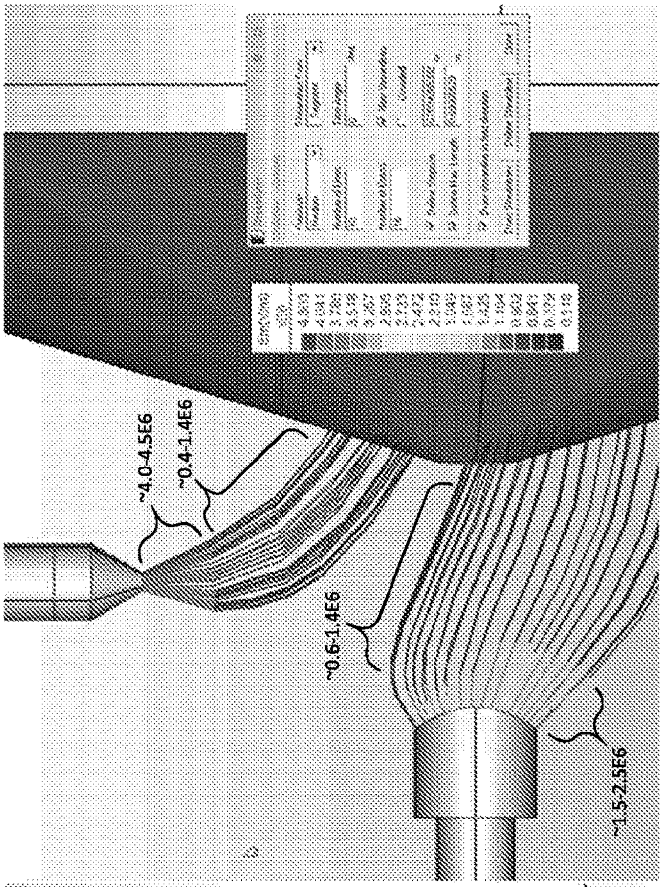
FIG. 10B depicts example electric field lines of the first ion probe while the elongate auxiliary electrode assembly of FIG. 1 is maintained at the same potential as the first ion probe.
Figure 10A:
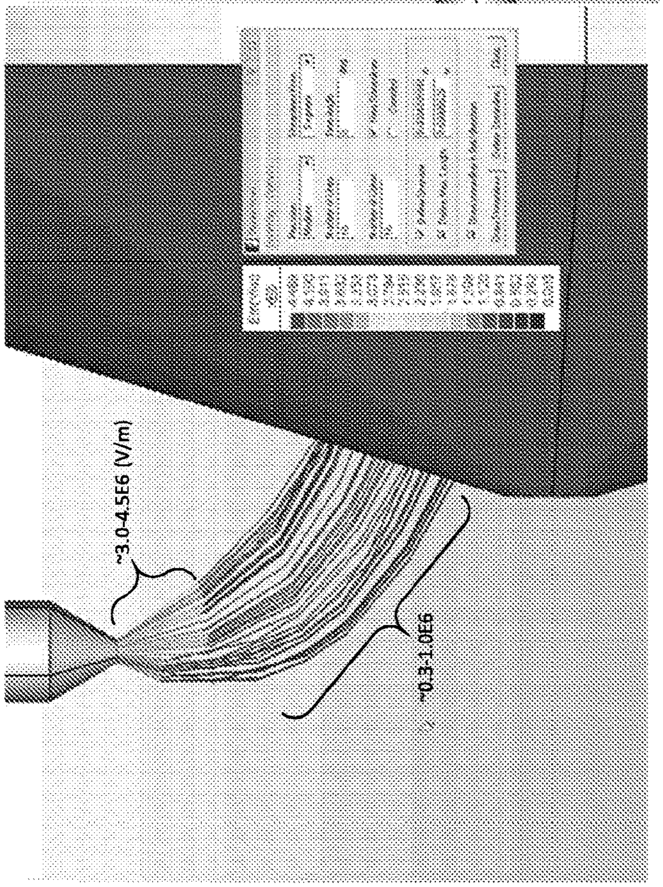
FIG. 10A depicts example electric field lines of the first ion probe operating without the elongate auxiliary electrode assembly of FIG. 1.

Exemplary electrical effects of the auxiliary electrode assembly 40 on the electrical field generated between the first ion probe 16 and the curtain plate 20 will now be described with reference to FIGS. 10A-F. First, FIG. 10A depicts an ANSYS model of the electric field lines between a first ion probe 16 and the curtain plate 20. In this model, nebulizer gas flow through the first ion probe 16 was set at zero (no flow). FIG. 10B depicts the change in the electric field lines when the auxiliary electrode assembly is energized to be at the same potential as the emitter. As will be appreciated by comparing FIGS. 10A and 10B, use of the auxiliary electrode assembly alters the shape and distribution of the equipotential in the vicinity of the sample plume (i.e., discharged along the axis of the first ion probe 16) in that the electric field lines emanating from the first ion probe 16 in FIG. 10B are relatively denser and more parallel, thereby suggesting "flatter" equipotentials in the region of interest about the location of the sample plume and adjacent the sampling orifice 18. That is, the locally more closely-spaced equipotentials result in a higher gradient and electric field of greater intensity (as indicated by the color change in the ANSYS figures) that is better aligned with the sample plume desolvation path to the sampling orifice 18. The more uniform, higher intensity electric field overlapping the sample plume means that more of the sample experiences higher electric field for ionization (ion ejection), while being more effectively confined towards the sampling orifice (droplets carried to the far side by nebulizer gas expansion (not shown in the ANSYS figures) are pushed to the front by the electric field) and more effective transport as the field lines are more directly aligned with the path to orifice and cover wider area, pushing the ions towards the orifice. Experimental data with an undesolvated sample plume shows little effect as droplet momentum is too high for the heavier droplets to follow the field lines.

Figure 10D:
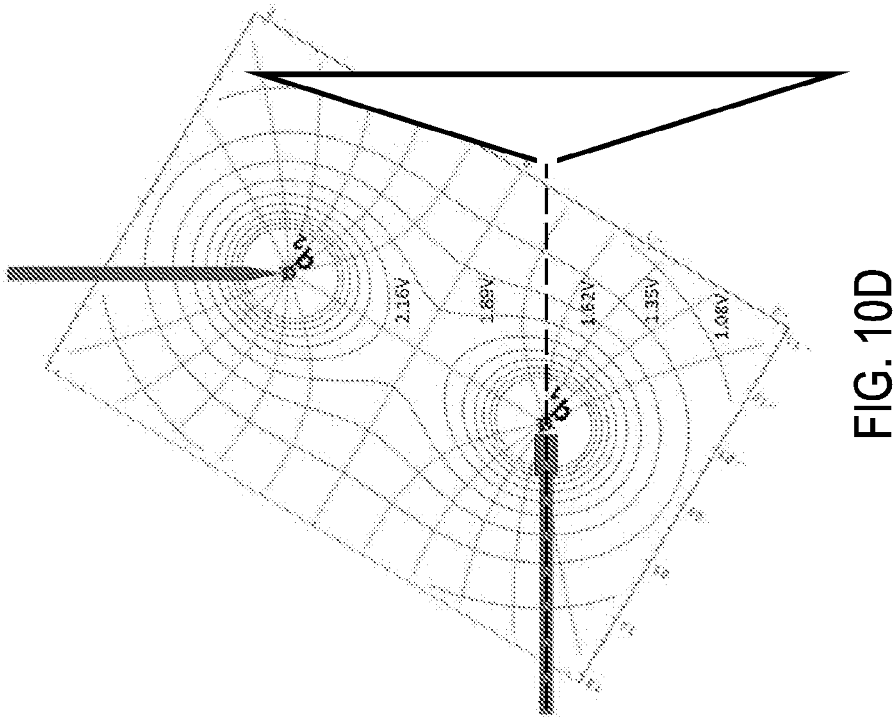
FIG. 10D depicts exemplary equipotentials generated by a model corresponding to FIG. 10B.
Figure 10C:
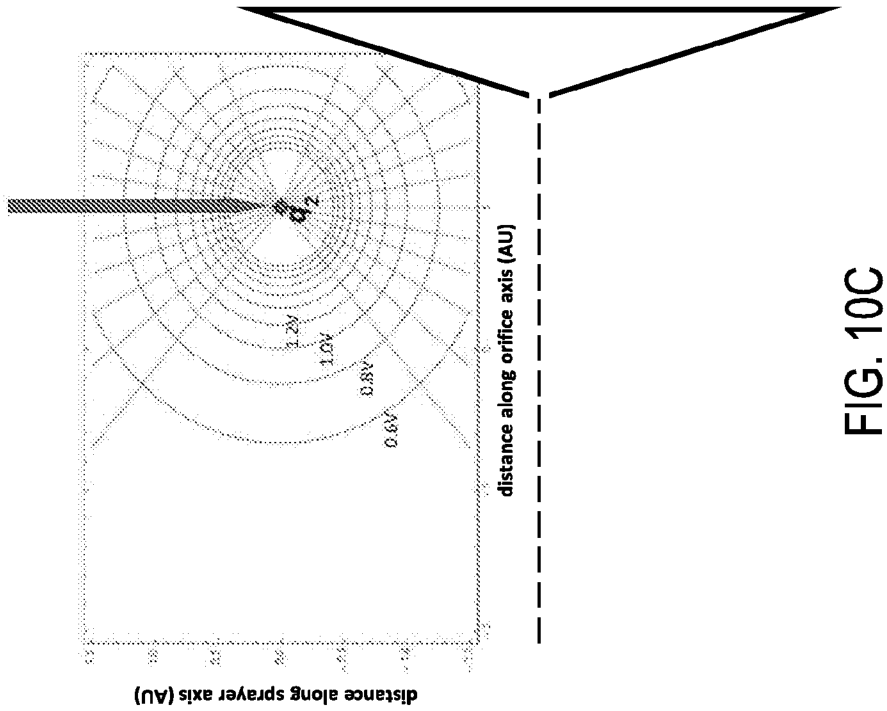
FIG. 10C depicts exemplary equipotentials generated by a model corresponding to FIG. 10A.

FIG. 10C conceptually depicts a general form of equipotential lines corresponding to the electric field lines of the source geometry shown in FIGS. 10A, while FIG. 10D conceptually depicts a general form of equipotential lines for a source geometry indicated by the model of FIG. 10B, with the curtain plate overlay indicating the approximate location of an exemplary sampling orifice 18 and its central axis. As shown, the equipotential lines are flatter and more parallel in FIG. 10D, suggesting that the ions are more likely to be drawn into the orifice.

Figure 10F:
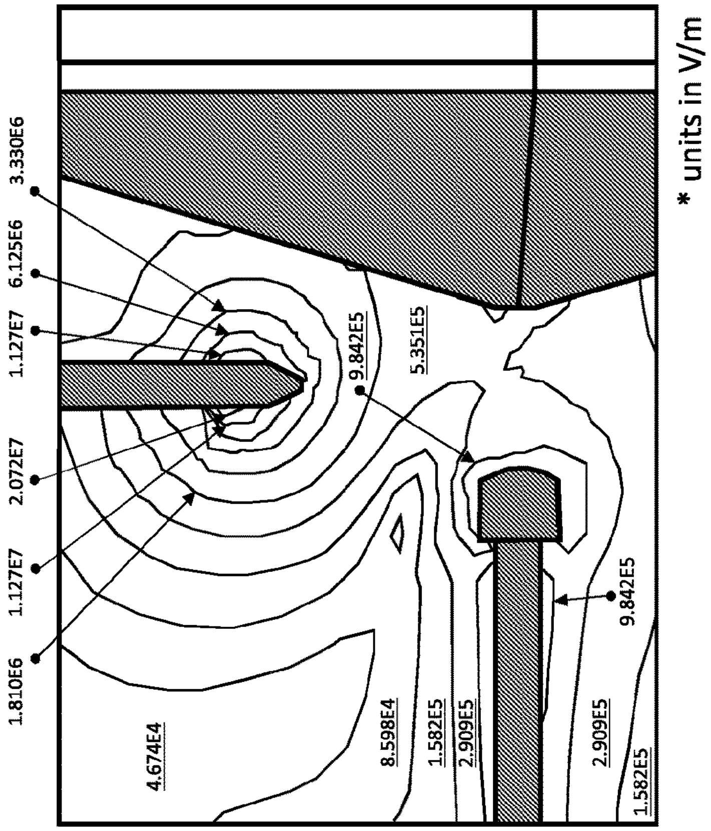
FIG. 10F depicts example electric field magnitude of the first ion probe in the plane of the probe as shown in FIG. 10B.
Figure 10E:
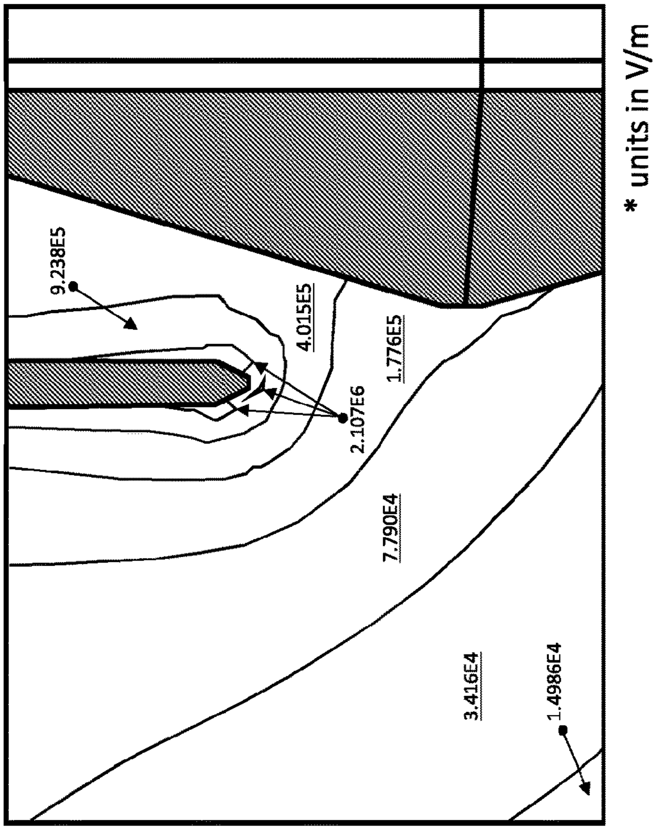
FIG. 10E depicts example electric field magnitude of the first ion probe in the plane of the probe as shown in FIG. 10A.

FIG. 10E depicts the electric field magnitude of the first ion probe 16 in the plane of the probe as shown in FIG. 10A, while FIG. 10F depicts the electric field magnitude of the first ion probe 16 and auxiliary electrode assembly 40 in the plane of the probe as shown in FIG. 10B. In FIG. 10F, the electric field strength is much higher in the sample trajectory region, as well as the electric field gradient. In the conventional configuration of FIG. 10E, the electric field in the vicinity of the discharge tip is $92.4\times10^4$ V/m and drops to $17.8\times10^4$ V/m at the mass spectrometer orifice, the change in the electric field $\Delta=74.6\times10^4$ V/m over a path of ~19 mm. When the auxiliary electrode assembly is energized as in FIG. 10F, the electric fields are substantially higher at both the discharge tip ($112.7\times10^5$ V/m) and the sampling orifice ($5.35\times10^5$ V/m) the A being $107.4\times10^5$ V/m over the same ~19 mm path. The electric fields and gradient are about an order of magnitude higher in the configuration of FIG. 1 in accordance with the present teachings, thereby allowing a more efficient ionization (ion ejection), ion confinement and ion transport. The electric field gradient is associated with charged droplet splitting and eventual ion ejection from the droplet as it capitalizes on the different response of the relatively massive droplet against the much more mobile surface charge response.

Figure 11:
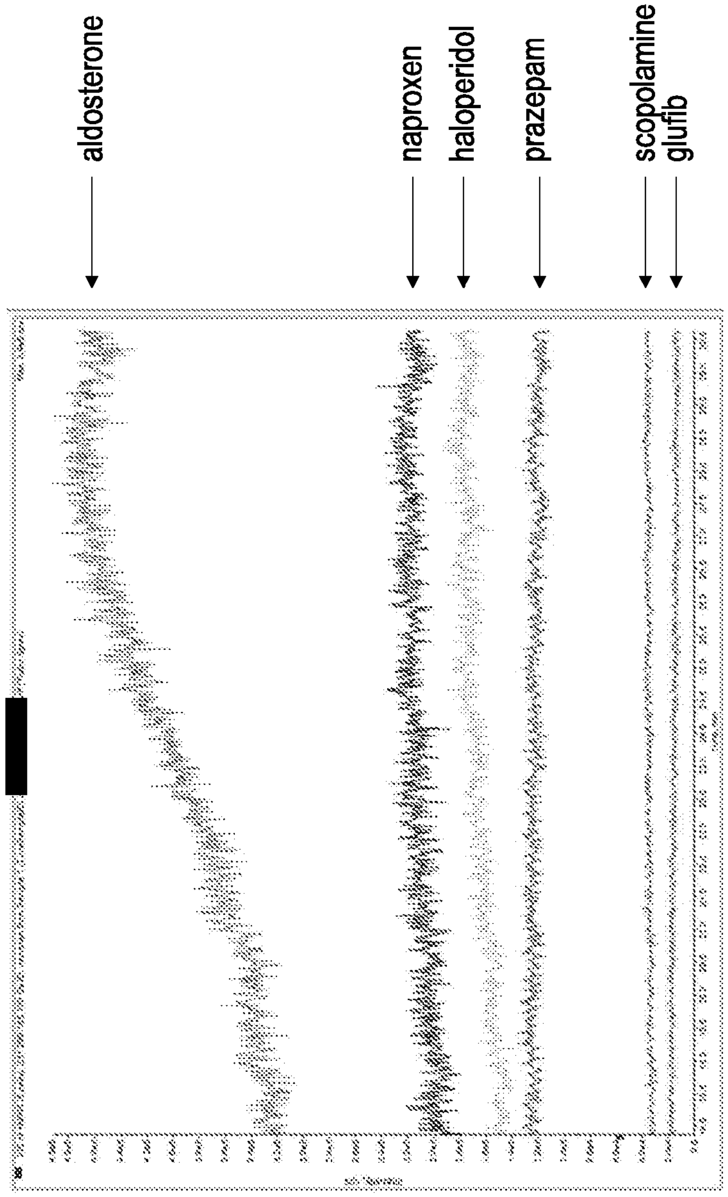
FIG. 11 depicts an example of the thermal effect of the elongate auxiliary electrode assembly through the signal increase of ions as the temperature of the ion source of FIG. 1 is raised to 700 C.°.

Exemplary thermal effects of the auxiliary electrode assembly 40 on the sample plume generated by the first ion probe 16 and the curtain plate 20 will now be described with reference to FIG. 11. FIG. 11 (y-axis=ion intensity, x-axis=time) demonstrates the effect of adding a thermal mass adjacent the sample path in the gradual signal increase of the "heat tolerant" molecules in the six mix used in the MRM tests that generated data in Tables 1 and 2 above. Aldosterone, haloperidol, naproxen, and scopolamine (i.e., the "heat tolerant" molecules) all exhibited increasing signal intensity over a time period consistent with passive heating of the distal end of the auxiliary electrode assembly, which indicates that ionization efficiency/sampling was improved as the thermal mass of the auxiliary electrode assembly achieved equilibrium with the heated ionization chamber. The gradual increase was not present in the signal when tested without the auxiliary electrode assembly.

Figure 12:
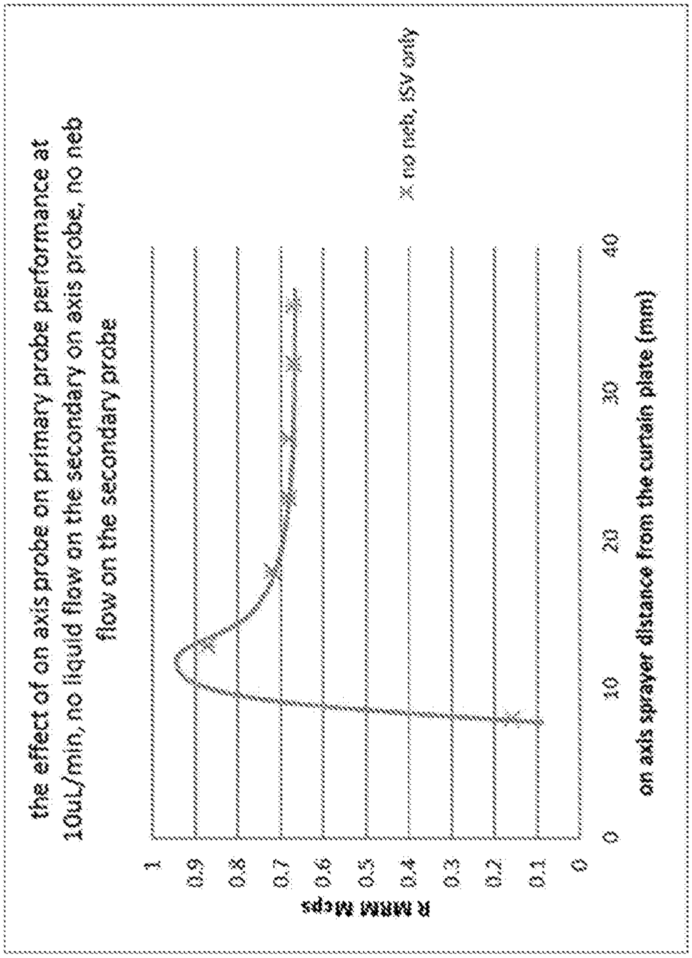
FIG. 12 depicts optimization data regarding the distance from the distal end of the elongate electrode assembly of FIG. 1 from the sampling orifice under particular example conditions.

As noted above with respect to FIG. 1, in certain embodiments, the axial distance D1 between the distal most surface 43 of the distal end 40*d* of the auxiliary electrode assembly 40 and the sampling orifice 18 of the curtain plate 20 can be set such that the distance between the distal end 40*d* and the central axis (C) of the first ion probe 16 (i.e., D1-D2) is in a range of about 1 millimeters (mm) to about 20 mm (e.g., about 5.5 mm). FIG. 12 depicts data regarding the distance from the distal end of the elongate electrode assembly of FIG. 1 from the sampling orifice under particular example conditions. As will be appreciated by a person skilled in the art, the position of the electrode assembly may be critical to the effect therefrom as a sharp drop in signal intensity is observed on either side of the maxima (~11 mm from the curtain plate) and may be optimized for a particular ion source assembly depending, for example, on the electric field intensity, liquid flow rate into the first ion probe 16, the voltages applied to the emitter and/or the auxiliary electrode assembly, etc.

Figure 13A:
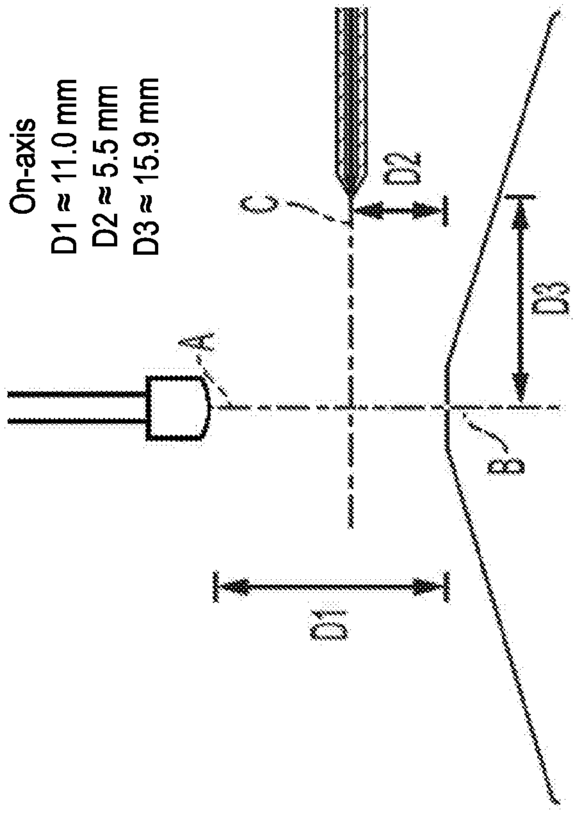
FIG. 13A depicts an ion source having a first electrospray ion probe and an elongate auxiliary electrode assembly having a distal electrically conductive end disposed on the axis of the sampling orifice in accordance with various aspects of the applicant's teachings.
Figure 13B:
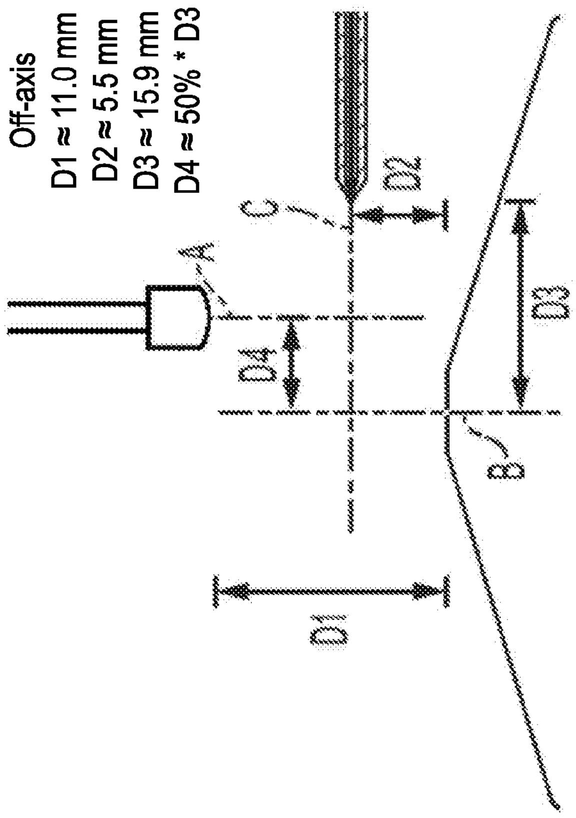
FIG. 13B depicts an ion source having a first electrospray ion probe and an elongate auxiliary electrode assembly having a distal electrically conductive end disposed off-axis relative to the sampling orifice in accordance with various aspects of the applicant's teachings.
Figure 13C:
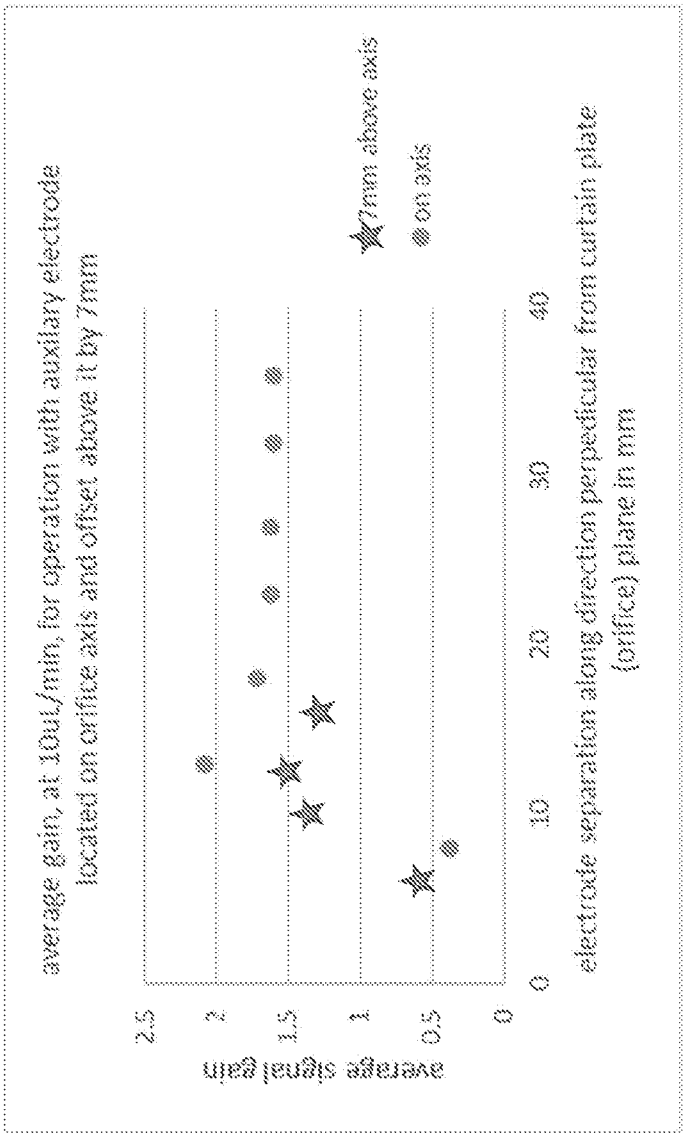
FIG. 13C depicts example data comparing the performance of the example elongate electrode assemblies of FIGS. 13A and 13B.

As noted above with respect to FIG. 1, the electrically conductive distal end of the auxiliary electrode assembly 40 may be disposed at a variety of positions within the ionization chamber relative to the ion probe 16 and the sampling orifice 18 in accordance with the present teachings such that, when coupled to a power supply, an auxiliary electric field can be generated within the ionization chamber to aid in the ejection and transport of ions in the sample plume toward the sampling orifice 18. With reference now to FIGS. 13A-B, various example configurations of an ion source assembly in accordance with the present teachings are depicted in which the distal electrode is disposed on-axis (FIG. 13A) and off-axis (FIG. 13B). As shown in FIG. 13A, the central axis (B) of the sampling orifice extends through the distal electrode, and indeed, is co-axial with the longitudinal axis (A) of the auxiliary electrode assembly. In another exemplary assembly as shown in FIG. 13B, however, the distal electrode is offset from the central axis (B) of the sampling orifice such that the distance (D4) between the end of the electrode and the central axis (C) is about 50% of the distance (D3) between the end of the ion probe and the central axis (C). It will be appreciated by a person skilled in the art that the relative positioning between the distal electrode, the ion probe, and the sampling orifice can be optimized in accordance with the present teachings, though the applicants have discovered that the distal electrode is generally a distance (D4) from the central axis (C) that is within about 70% of the distance (D3) (e.g., within 50%, within 30%, within 10%, within 5%) or on the central axis of the sampling orifice. FIG. 13C, for example, compares the average gain observed by the use of an auxiliary electrode assembly relative to no auxiliary electrode assembly under two conditions: i) when the electrode is disposed on-axis relative (FIG. 13A); and ii) when the electrode is about 7 mm (D4) off axis. D2 is approximately 15.9 mm in both configurations, while D1 varies as shown on the x-axis. As shown, both configurations of FIGS. 13A and 13B result in a substantial gain relative to no electrode being used, though the on-axis configuration of FIG. 13A results in an average signal gain of almost 2 for the six mix used in the MRM tests that generated data in Tables 1 and 2 above.

Those skilled in the art will know or be able to ascertain using no more than routine experimentation, many equivalents to the embodiments and practices described herein. By way of example, the dimensions of the various components and explicit values for particular electrical signals (e.g., amplitude, frequencies, etc.) applied to the various components are merely exemplary and are not intended to limit the scope of the present teachings. Accordingly, it will be understood that the invention is not to be limited to the embodiments disclosed herein, but is to be understood from the following claims, which are to be interpreted as broadly as allowed under the law.

The section headings used herein are for organizational purposes only and are not to be construed as limiting. While the applicant's teachings are described in conjunction with various embodiments, it is not intended that the applicant's teachings be limited to such embodiments. On the contrary, the applicant's teachings encompass various alternatives, modifications, and equivalents, as will be appreciated by those of skill in the art.

The invention claimed is:

1. An electrospray ion source assembly for use in a mass spectrometry system, comprising:

a housing defining an ionization chamber configured to be disposed in fluid communication with a sampling orifice of a mass spectrometer system, the housing providing at least a first opening configured for coupling to a first electrospray probe, the first electrospray probe configured to discharge a liquid sample into the ionization chamber at sample flow rates greater than a nanoflow range such that the discharged liquid forms a sample plume comprising a plurality of sample droplets, wherein the first opening of the housing and the first electrospray probe are configured such that a longitudinal axis of the first electrospray probe is substantially orthogonal to a central axis of the sampling orifice, wherein the first electrospray probe is separated from the central axis of the sampling orifice along the longitudinal axis of the first electrospray probe by a first distance; and an elongate auxiliary electrode assembly extending from the housing to an electrically conductive distal end disposed in the ionization chamber, the electrically conductive distal end being offset from the central axis of the sampling orifice such that a second distance from the electrically conductive distal end to the central axis of the sampling orifice, in a direction of the central axis of the sampling orifice, is in a range of about 5% of the first distance to about 70% of the first distance, and the electrically conductive distal end configured to couple to a power supply so as to generate an electric field within the ionization chamber to improve the desolvation of the sample plume and the transport of ions ejected from the sample plume into the sampling orifice.

2. The electrospray ion source assembly of claim 1, wherein the second distance is less than 10% of the first distance.

3. The electrospray ion source assembly of claim 1, wherein the housing further comprises a second opening configured for removable coupling of the elongate auxiliary electrode assembly to the housing, optionally, wherein said second opening is further configured for alternatively coupling a second electrospray probe, wherein said second opening of the housing and said second electrospray probe are configured such that a longitudinal axis of said second electrospray probe is positioned in the housing substantially co-axial with the central axis of the sampling orifice.

4. The electrospray ion source assembly of claim 1, wherein the elongate auxiliary electrode assembly further comprises an electrically conductive emitter extending through a central bore in the electrically conductive distal end for discharging a sample solution into the ionization chamber along the central axis of the sampling orifice, optionally, wherein the elongate auxiliary electrode assembly is configured to deliver nebulizing gas while discharging the sample solution from the electrically conductive emitter of the elongate auxiliary electrode assembly; and further optionally, wherein the sample solution comprises a calibration solution.

5. The electrospray ion source assembly of claim 1, wherein the electric field generated by the electrically conductive distal end is configured to alter the electric field generated between the first electrospray probe and a curtain plate through which the sampling orifice extends, optionally, wherein the electric field generated by the electrically conductive distal end is configured to change the electric field gradient in the vicinity of the sampling orifice.

6. The electrospray ion source assembly of claim 1, wherein the elongate auxiliary electrode assembly is asymmetrically disposed relative to the sample plume, optionally, wherein the sample plume does not flow through the electrically conductive distal end.

7. The electrospray ion source assembly of claim 1, further comprising a heater configured to heat the ionization chamber, wherein the elongate auxiliary electrode assembly is configured to provide radiative heating adjacent the sampling orifice to improve desolvation efficiency.

8. The electrospray ion source assembly of claim 1, wherein the elongate auxiliary electrode assembly is configured to increase turbulence of the sample plume adjacent the sampling orifice, optionally, wherein the ionization chamber is configured to be maintained at about atmospheric pressure.

9. The electrospray ion source assembly of claim 1, wherein each of the first electrospray electrode and the electrically conductive distal end are configured to be maintained at substantially the same DC voltage during discharge of the liquid sample from the first electrospray electrode.

10. The electrospray ion source assembly of claim 1, wherein the electrically conductive distal end terminates in a substantially planar surface, optionally, wherein the electrically conductive distal end is shaped as a concave surface; and optionally, wherein the concave surface is a parabolic cylinder and wherein a spine of the parabolic cylinder is parallel to the longitudinal axis of the first electrospray electrode.

11. The electrospray ion source assembly of claim 1, wherein the distal most surface of the electrically conductive distal end is separated from the longitudinal axis of the first electrospray probe by a distance in a range from about 1 mm to about 20 mm.

12. The electrospray ion source assembly of claim 1, wherein the first distance is in a range from about 10 mm to about 25 mm, optionally, wherein the width of the electrically conductive distal end is in a range of about 2 mm to about 10 mm.

13. A method of ionizing a sample, comprising:

providing a first electrospray probe configured for accommodating a sample flow rate in a range above a nanoflow range, said first electrospray probe being coupled to a first opening in a housing defining an ionization chamber disposed in fluid communication with a sampling orifice of a mass spectrometer system, wherein said first electrospray probe and said first opening are configured such that a longitudinal axis of the first electrospray probe is substantially orthogonal to a central axis of the sampling orifice, wherein the first electrospray probe is separated from the central axis of the sampling orifice along the longitudinal axis of the first electrospray probe by a first distance;

providing an elongate auxiliary electrode assembly that extends from the housing to an electrically conductive distal end disposed in the ionization chamber, the electrically conductive distal end being offset from the central axis of the sampling orifice such that a second distance from the electrically conductive distal end to the central axis of the sampling orifice, in a direction of the central axis of the sampling orifice, is in a range of about 5% of the first distance to about 70% of the first distance;

discharging a liquid sample from the first electrospray electrode into the ionization chamber to form a sample plume comprising a plurality of sample droplets; and while discharging the liquid sample from the first electrospray electrode, energizing the electrically conductive distal end of the elongate auxiliary electrode assembly to promote desolvation of the sample plume and the transport of ions ejected from the sample plume into the sampling orifice.

14. The method of claim 13, wherein the second distance is less than 10% of the first distance.

15. The method of claim 13, wherein the housing further comprises a second opening to which the elongate auxiliary electrode assembly is removably coupled, the method further comprising:

removing the elongate auxiliary electrode assembly from the second opening;

coupling a second electrospray probe accommodating sample flow rates in a nanoflow regime to the second opening, wherein said second opening of the housing and said second electrospray probe are configured such that a longitudinal axis of said second electrospray probe is positioned in the housing substantially co-axial with the central axis of the sampling orifice; and discharging a liquid sample from the second electrospray electrode.

16. The method of claim 15, further comprising plugging said second opening when one of the elongate auxiliary electrode assembly or the second electrospray probe is not coupled thereto.

17. The method of claim 13, further comprising heating the ionization chamber such that the elongate auxiliary electrode assembly provides radiative heating adjacent the sampling orifice to improve desolvation efficiency, optionally, wherein the sample plume is directed by the elongate auxiliary electrode assembly such that the elongate auxiliary electrode assembly is configured to increase turbulence of the sample plume adjacent the sampling orifice.

18. The method of claim 13, further comprising maintaining the ionization chamber at about atmospheric pressure.

19. The method of claim 13, wherein the first electrospray electrode and the electrically conductive distal end of the elongate auxiliary electrode are maintained at substantially the same DC voltage during discharge of the liquid sample from the first electrospray electrode.

20. The method of claim 13, wherein the elongate auxiliary electrode assembly further comprises an electrically conductive emitter extending through a central bore in the electrically conductive distal end, the method further comprising:

discharging a calibration solution from the electrically conductive emitter into the ionization chamber along the central axis of the sampling orifice.

* * * * *